US007428709B2

(12) United States Patent
Forstall et al.

(10) Patent No.: US 7,428,709 B2
(45) Date of Patent: Sep. 23, 2008

(54) MULTIPLE-PANEL SCROLLING

(75) Inventors: Scott James Forstall, Mountain View, CA (US); Gregory N. Christie, San Jose, CA (US); Kevin John Tiene, Cupertino, CA (US); Donald Dale Melton, San Carlos, CA (US); Stephen Lemay, San Francisco, CA (US); Wayne Russell Loofbourrow, San Jose, CA (US); Jessica Kahn, San Francisco, CA (US); David Hyatt, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 528 days.

(21) Appl. No.: 11/105,771

(22) Filed: Apr. 13, 2005

(65) Prior Publication Data

US 2006/0236261 A1  Oct. 19, 2006

(51) Int. Cl.
*G06F 3/048* (2006.01)

(52) U.S. Cl. .................. 715/784; 715/785; 715/786; 715/792

(58) Field of Classification Search ........... 715/786, 715/784, 785, 792
See application file for complete search history.

(56) References Cited

U.S. PATENT DOCUMENTS

| | | | | | |
|---|---|---|---|---|---|
| 5,877,760 | A | * | 3/1999 | Onda et al. | 715/784 |
| 5,943,051 | A | * | 8/1999 | Onda et al. | 715/786 |
| 5,999,176 | A | * | 12/1999 | Kamper | 715/787 |
| 6,020,887 | A | * | 2/2000 | Loring et al. | 715/786 |
| 6,141,007 | A | * | 10/2000 | Lebling et al. | 715/792 |
| 6,157,381 | A | * | 12/2000 | Bates et al. | 715/786 |
| 6,430,574 | B1 | * | 8/2002 | Stead | 707/104.1 |
| 6,473,101 | B1 | * | 10/2002 | Grigor et al. | 715/784 |
| 6,614,454 | B1 | * | 9/2003 | Livingston | 715/781 |
| 6,778,192 | B2 | * | 8/2004 | Arbab et al. | 715/786 |
| 6,912,694 | B1 | * | 6/2005 | Harrison et al. | 715/784 |
| 7,114,129 | B2 | * | 9/2006 | Awada et al. | 715/786 |
| 2002/0186251 | A1 | * | 12/2002 | Himmel et al. | 345/784 |
| 2004/0216056 | A1 | * | 10/2004 | Tootill | 715/786 |
| 2006/0174214 | A1 | * | 8/2006 | McKee et al. | 715/802 |
| 2006/0174242 | A1 | * | 8/2006 | Cok | 715/786 |

OTHER PUBLICATIONS

Microsoft Computer Dictionary, 2002, Microsoft Press, Fifth Edition, p. 467.*
Temple, B., "The Complete Idiot's Guide to Microsoft Outlook 2000," Que, 1999, [online] [Retrieved on May 16, 2007] <URL:http://www.netlibrary.com/nlreader.dII?bookid=8128&filename=Page_ii.html>.
"Microsoft Outlook 2000 SP-3," Microsoft Corporation, 1995-1999, 16 Pages.

* cited by examiner

*Primary Examiner*—Tadesse Hailu
*Assistant Examiner*—Nicholas S Ulrich
(74) *Attorney, Agent, or Firm*—Fenwick & West LLP

(57) ABSTRACT

In a scrollable user interface window including two or more panels, a single scroll bar scrolls all of the panels. Panels move in lock-step with one another at certain times, but not at other times, depending on whether the lock-step scrolling would cause blank areas to be displayed. If the user's scroll commands would result in a blank area of a panel being displayed, the scroll command is not performed; rather, the panel remains frozen in its current position, even while other panel(s) do scroll. Thus, the present invention ensures that useful content is displayed at all times in all panels, and no screen real estate is wasted due to scrolling operations.

41 Claims, 16 Drawing Sheets

RSS Feeds

AK Steel, Overstock.com, Reuters, Sprint, more Today, 06:25 PM
The latest on stocks that made major moves in U.S. equity markets. Read more...

Dollar Falls Against Most Rivals Today, 06:23 PM
Dollar Declines Against Rivals As Falling Oil Prices Help the Yen Reach Three-Month Highs Read more...

Electronic Arts net rises 27% as sales jump 35% Today, 06:22 PM
LOS ANGELES (CBS.MW) - Electronic Arts said Tuesday its fiscal second-quarter earnings rose 27 percent, yet the video game maker's shares fell 5 percent after it cut its profit forecast for the December quarter because several games will ship later than expected. Read more...

Electronic Arts net rises 27% as sales jump 35% Today, 06:22 PM
LOS ANGELES (CBS.MW) - Electronic Arts said Tuesday its fiscal second-quarter earnings rose 27 percent, yet the video game maker's shares fell 5 percent after it cut its profit forecast for the December quarter because several games will ship later than expected. Read more...

FDA Searches Worldwide for More Flu Shots Today, 06:20 PM
FDA Searches Worldwide for More Flu Vaccine, Says 2.6M More Doses Will Be Available in January Read more...

Millipore Q3 Income rises 2% Today, 06:19 PM
WASHINGTON (CBS.MW) -- Biotechnology firm Millipore Corp.'s third-quarter profits inched up 2 percent, though

---

1041 New, 1041 Total

CBS MarketWatch...
MedicineNet Daily...
The New York Time...
The New York Time...
The New York Time...
The New York Time...
The New York Time...
The New York Time...
The New York Time...
The New York Time...
The New York Time...
O'Reilly Network D...
RollingStone.com...
RollingStone.com...
SPACE.com
washingtonpost.co...
washingtonpost.co...
washingtonpost.co...
washingtonpost.co...
washingtonpost.co...
washingtonpost.co...
washingtonpost.co...

Actions:
Mail Link to This Page
Add Bookmark...

FIG. 4E

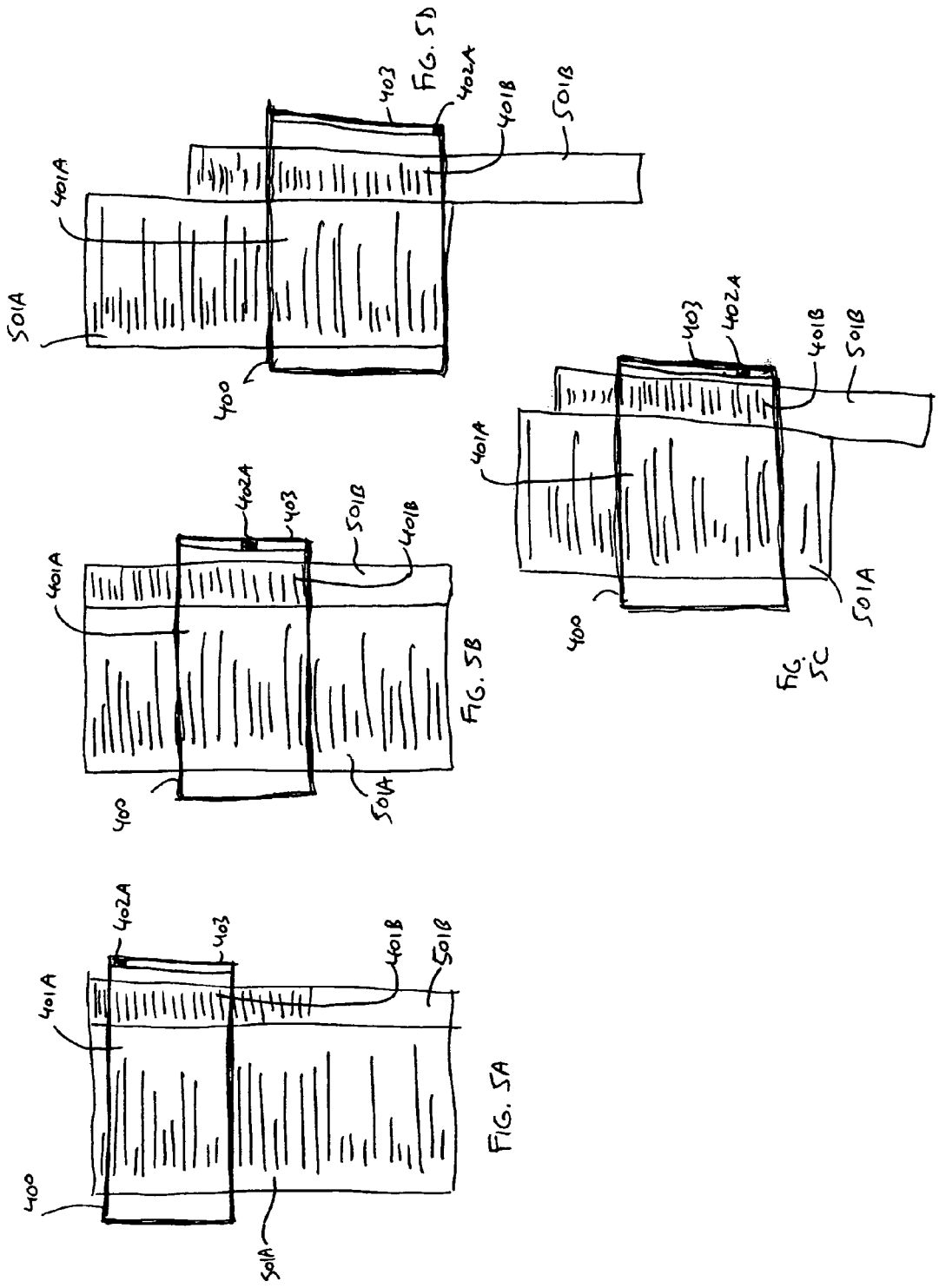

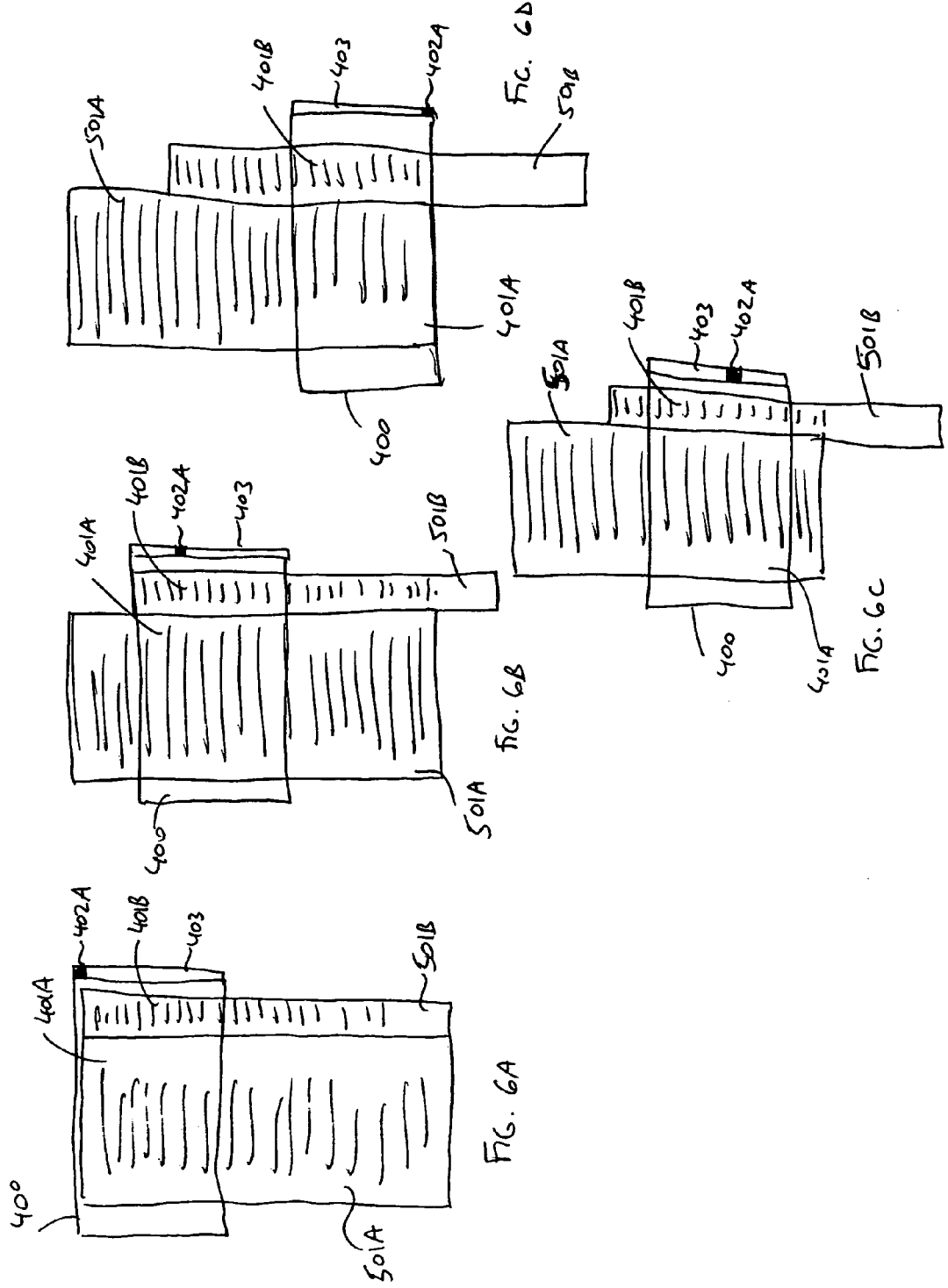

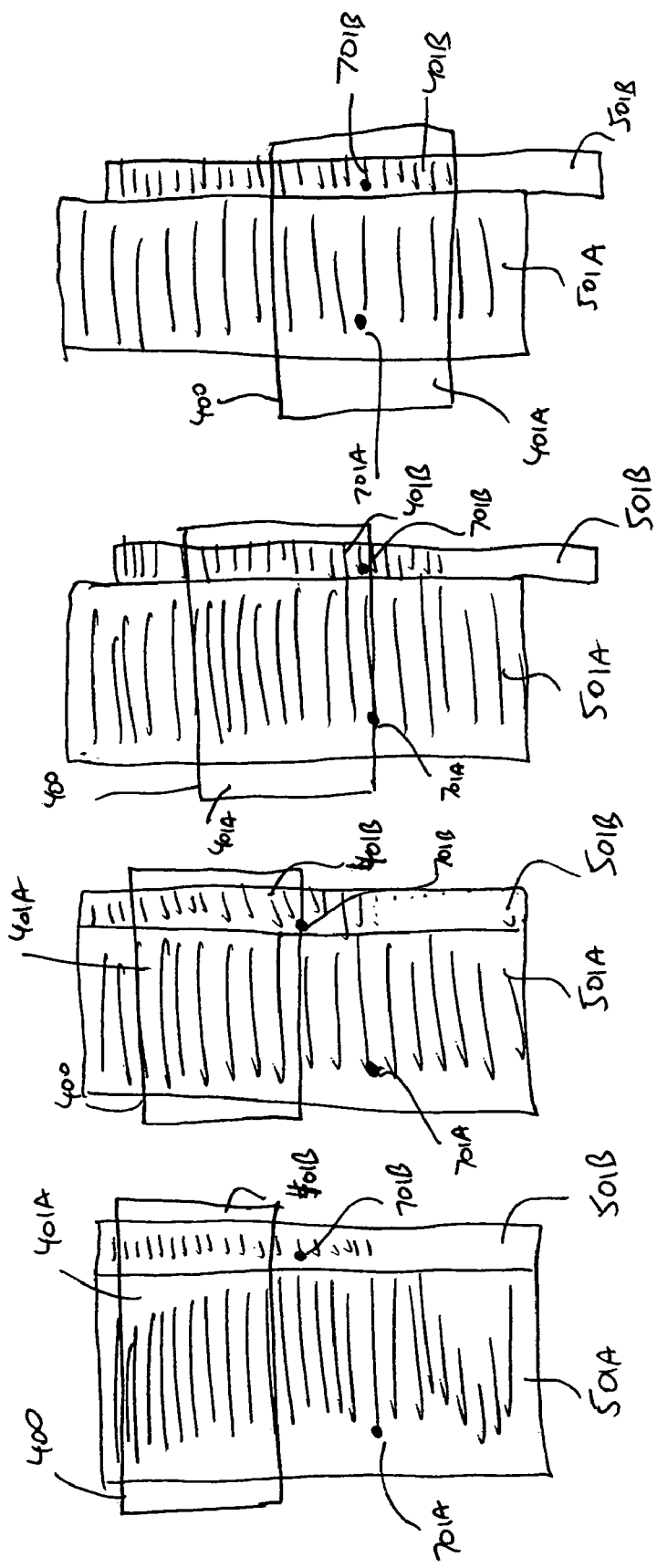

MULTIPLE-PANEL SCROLLING

CROSS-REFERENCE TO RELATED APPLICATIONS

The present invention is related to the following patent applications, which are hereby incorporated by reference:

U.S. patent application Ser. No. 11/105,810, filed on the same date as the present application, entitled "News Feed Viewer"; and U.S. patent application Ser. No. 11/105,637, filed on the same date as the present application, entitled "News Feed Browser".

FIELD OF THE INVENTION

The present invention relates generally to scrolling windows in a user interface, and more particularly to techniques for scrolling a window having two or more panels.

BACKGROUND OF THE INVENTION

Scrolling is a well-known feature of graphical user interfaces. When the size of a document being displayed in an on-screen window exceeds the size of the window, scrolling allows a user to control which portion of the document is shown at any given time. Typical user interface elements for controlling scrolling operations include horizontal and vertical scroll bars, scroll "thumb" widgets that move within the scroll bars to indicate the current position of the viewable area within the overall document, and arrow buttons for incrementally shifting the viewable area by some predetermined amount (such as line-by-line, or page-by-page). The user can shift the position of the viewable area in any of a number of different ways. The user can drag a thumb widget to any position within its scroll bar to shift the viewable area to a location corresponding to the new widget position. The user can also click within a scroll bar at a location other than the current thumb widget position to shift the viewable area by some predetermined amount (such as by page). Or the user can click on arrow buttons to shift the viewable area by some smaller predetermined amount (such as by line). If the user has a mouse that includes a scroll wheel, the user can turn the wheel to scroll on a line-by-line basis as well. Keyboard control may also be provided. Other techniques are also known in the art for causing the scroll position to change.

In some cases, scroll bars are provided for scrolling in two dimensions—a horizontal scroll bar and a vertical scroll bar. In other cases, only one dimension of scrolling is needed, and only one scroll bar is provided.

One example of a software application that makes use of scroll bars is a web browser. Usually, the size of a web page being displayed in a browser window exceeds the size of the window itself. Most browser applications display vertical and/or horizontal scroll bars in order to allow a user to position the window within the larger web page. An example of a conventional scroll bar arrangement in a browser is shown in FIGS. 1A and 1B. Scroll bar 101 controls the scroll position of web page 103 within window 100. Scroll thumb 102 indicates, by its position within scroll bar 101, the current scroll position of web page 103. The user can move scroll thumb 102 up or down by dragging it, or by clicking on an area of scroll bar 101 above or below scroll thumb 102, or by clicking on arrow buttons 104. As in many conventional user interfaces, scroll thumb 102 varies in size according to the percentage of web page 103 that is visible in window 100. FIG. 1A shows window 100 where the scroll position reveals the top of web page 103, while FIG. 1B shows window 100 where the scroll position reveals the bottom of the same web page 103.

For purposes of this description, the term "panel" is used to refer to any portion of a document, such as a web page, that is logically, visually, or structurally separable from other portions of the document. Examples of panels include columns, rows, frames, cells, and the like, as shown in FIGS. 2, 3A, 3B, 3C, and 3D. Panels can be delineated by visible boundaries or they may not be so delineated. For purposes of this description, the word "document" is used; however, one skilled in the art will recognize that the techniques of the present invention can be applied to any on-screen display wherein one or more scroll bars are used to control which part of a displayable region is currently shown on the screen. For example, the present invention can be used for scrolling in a display of on-screen icons in a program or operating system function for viewing and manipulating files.

Some documents include multiple panels, or regions, containing different types of information. For example a web page may include a plurality of frames, or table cells, or columns, each containing text and/or other data. A document in a word processing application or spreadsheet application may include a plurality of columns. Generally, such situations are handled in one of two ways: either a separate scroll bar is provided for each panel, or a single scroll bar is provided, which causes all panels to be shifted in concert with one another. FIG. 2 shows an example of a prior art system where a web page 103 including multiple panels (frames) 201A, 201B is being displayed, with separate scroll bars 101A, 101B (including thumbs 102A, 102B and arrow buttons 104A, 104B) for each frame 201A, 201B.

FIGS. 3A, 3B, 3C, and 3D show an example where a single scroll bar 101 controls the scroll position of multiple panels 201A, 201B, 201C; the multiple panels 201A, 201B, 201C scroll in lock-step with one another.

In cases where one panel has more information than another, either of these techniques may be deficient. The use of separate scroll bars for each panel is cumbersome, as it requires the user to manually scroll each panel separately. The lock-step approach simplifies the scrolling operation; but in situations where one panel contains more data than another, the panel containing the lesser amount of data is not used effectively, since it remains blank after the end of the data has been reached, while the panel containing the greater amount of data continues to scroll.

For example, in FIG. 3B the user has scrolled part-way down, so that the scroll position is at the end of the data in panel 201A (although additional data exists in panel 201B). As the user continues to scroll, the additional data in panel 201B is shown, but panels 201A and 201C are left blank. FIG. 3C shows the window position when the user is near the end of the data in panel 201B; panels 201A and 201C are blank and constitute wasted space.

SUMMARY OF THE INVENTION

The present invention provides an improved mechanism for scrolling multiple panels. Panels move in lock-step with one another at certain times, but not at other times, depending on whether the lock-step scrolling would cause blank areas to be displayed.

The user need only manipulate one set of scroll controls. Each panel scrolls in response to the user's scroll commands normally, except when the indicated scrolling operation would cause a blank area to be displayed. If the user's commands would result in a blank area of a panel being displayed, the scroll command is not performed; rather, the panel remains frozen in its current position, even while other panel(s) do scroll. Thus, the present invention helps optimize the use of available screen real estate.

In addition, the present invention allows the user to scroll useful information in the shorter panel back into view faster, since he or she is not forced to wade through a long blank area before getting back to a section where content is displayed.

BRIEF DESCRIPTION OF THE DRAWINGS

The accompanying drawings illustrate several embodiments of the invention and, together with the description, serve to explain the principles of the invention.

FIG. 4A is a screen shot depicting an example of a multiple-panel window at a top scroll position, according to an embodiment of the present invention.

FIG. 4B is a screen shot depicting an example of a multiple-panel window at a second scroll position, where all panels actively scroll in lock-step with one another according to an embodiment of the present invention.

FIG. 4C is a screen shot depicting an example of a multiple-panel window at a third scroll position, where all panels actively scroll in lock-step with one another according to an embodiment of the present invention.

FIG. 4D is a screen shot depicting an example of a multiple-panel window at a fourth scroll position, where further scrolling will cause only one of the panels to scroll, while the other remains frozen in position, according to an embodiment of the present invention.

Figure 1A:
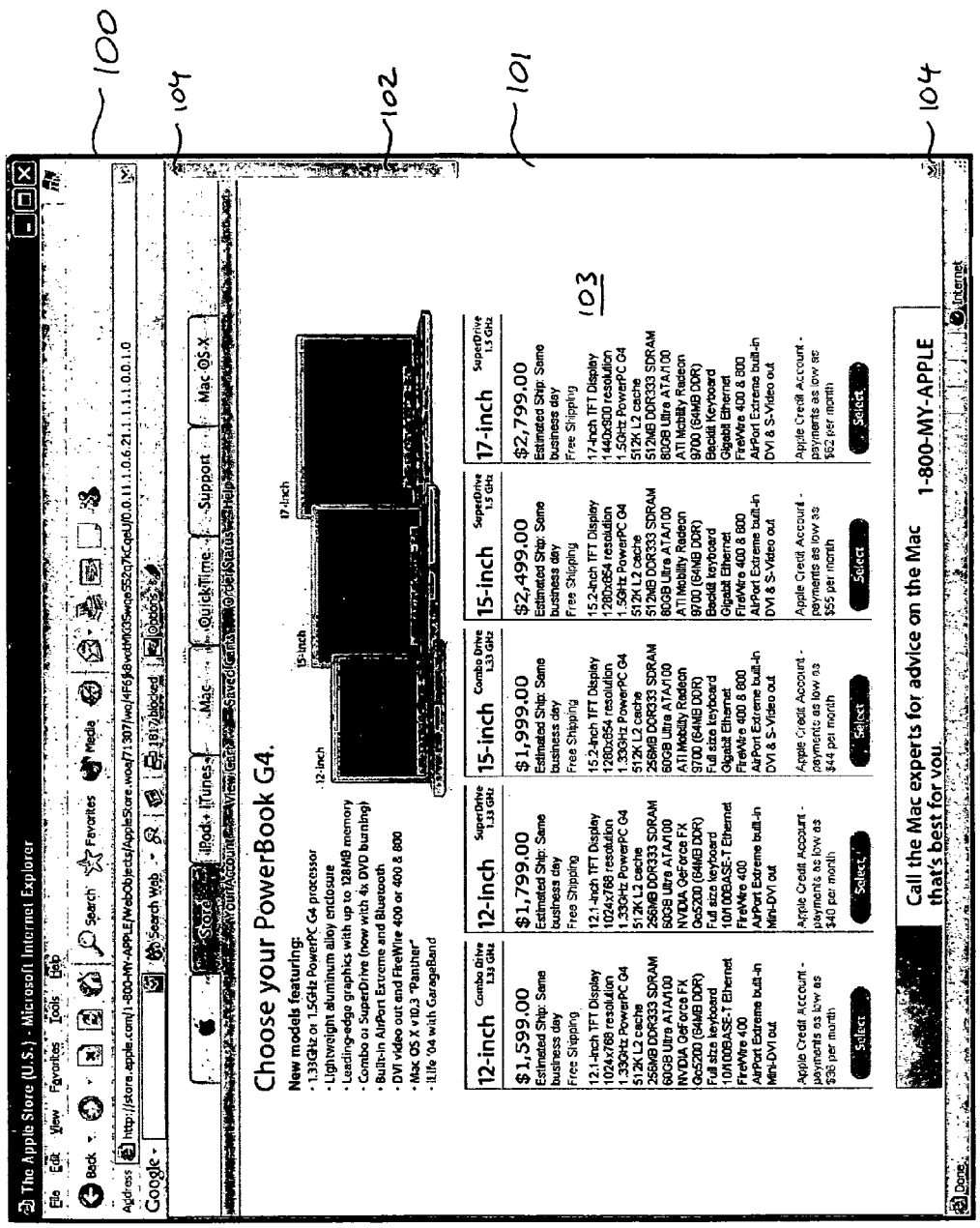
FIGS. 1A and 1B are screen shots depicting an example of a browser window employing scroll bars according to the prior art.
Figure 1B:
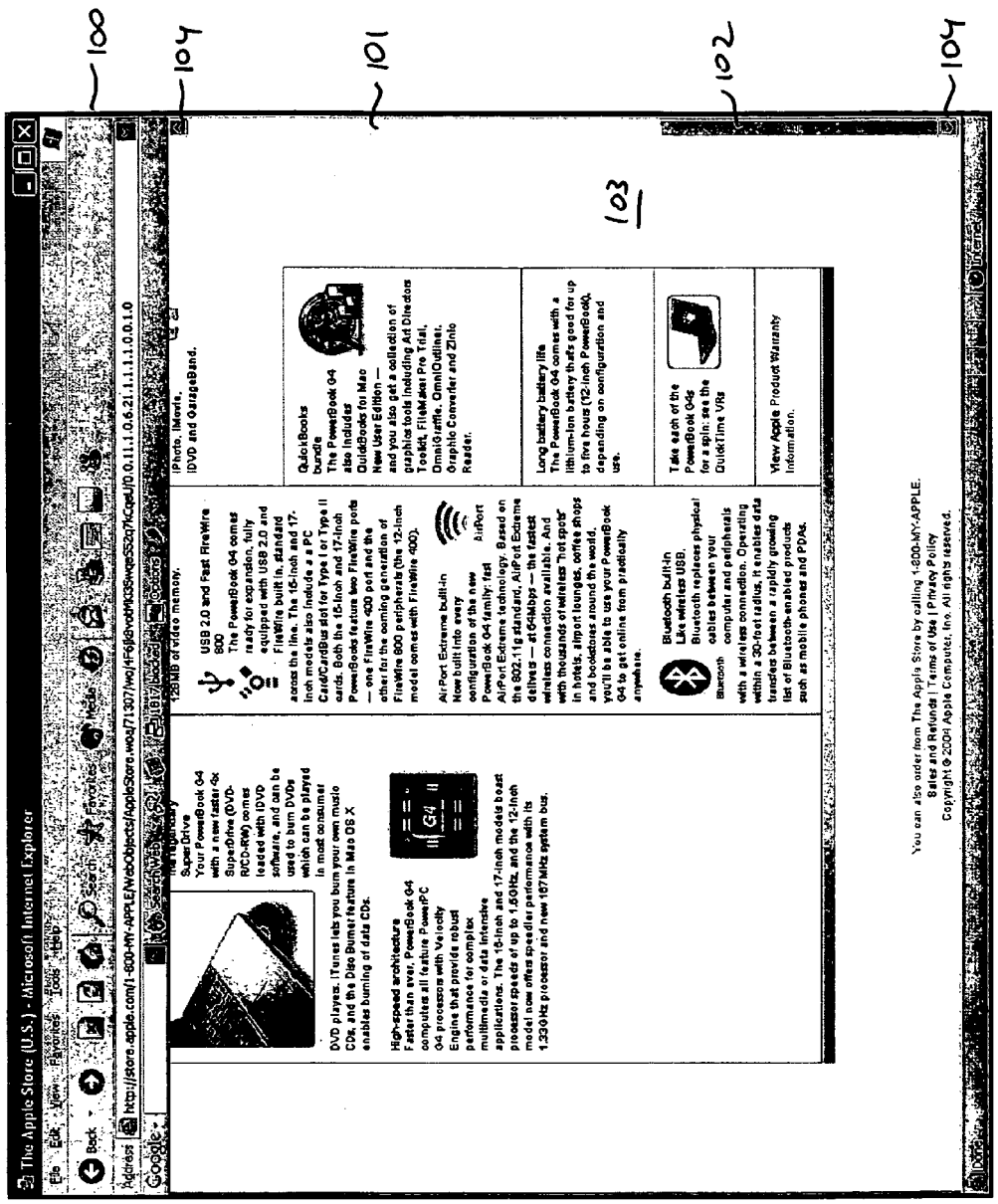
Figure 3A:
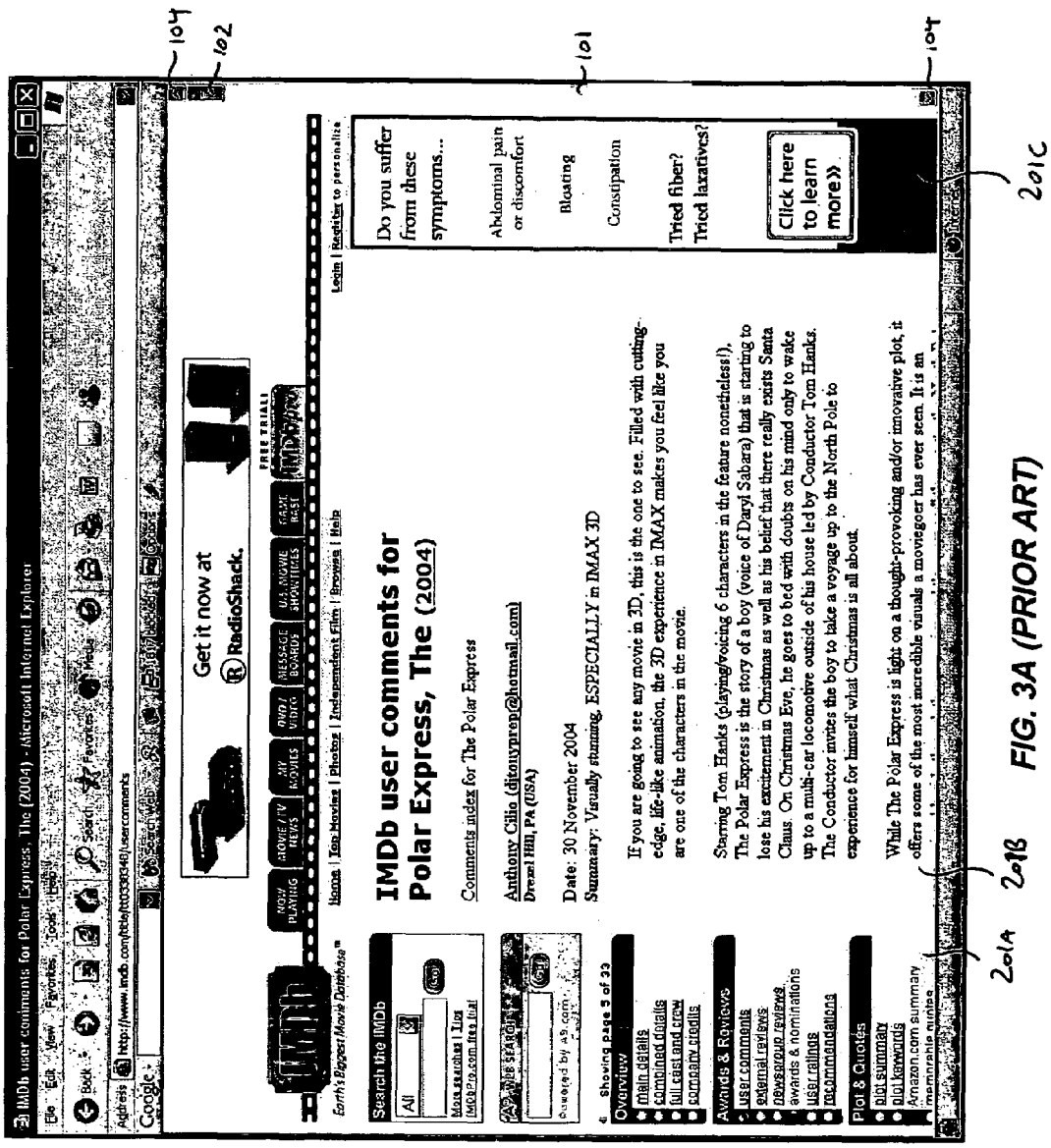
FIGS. 3A through 3D are screen shots depicting an example of a multiple-panel window where multiple panels are scrolled in lock-step with one another, according to the prior art.
Figure 3C:
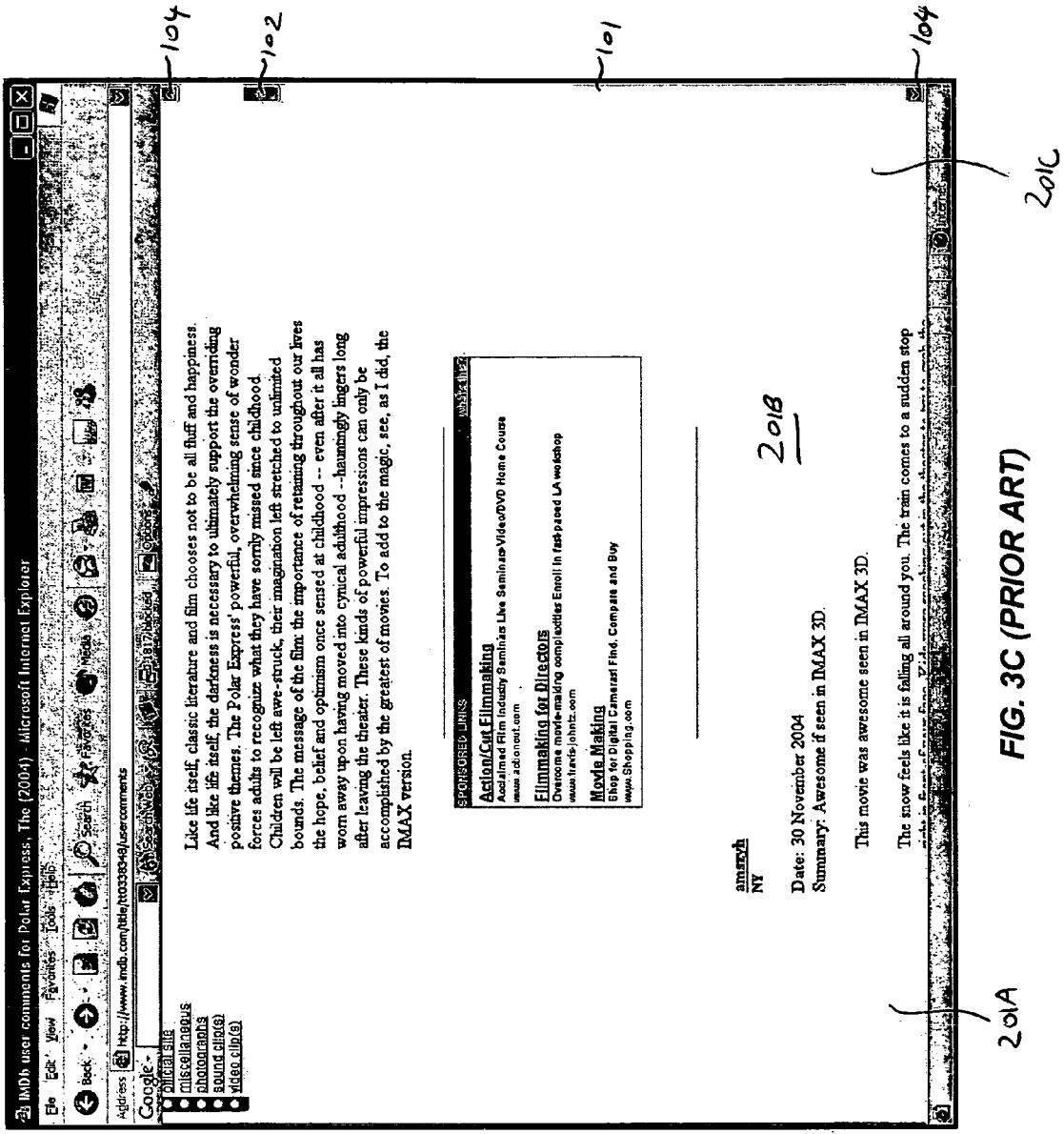
Figure 3B:
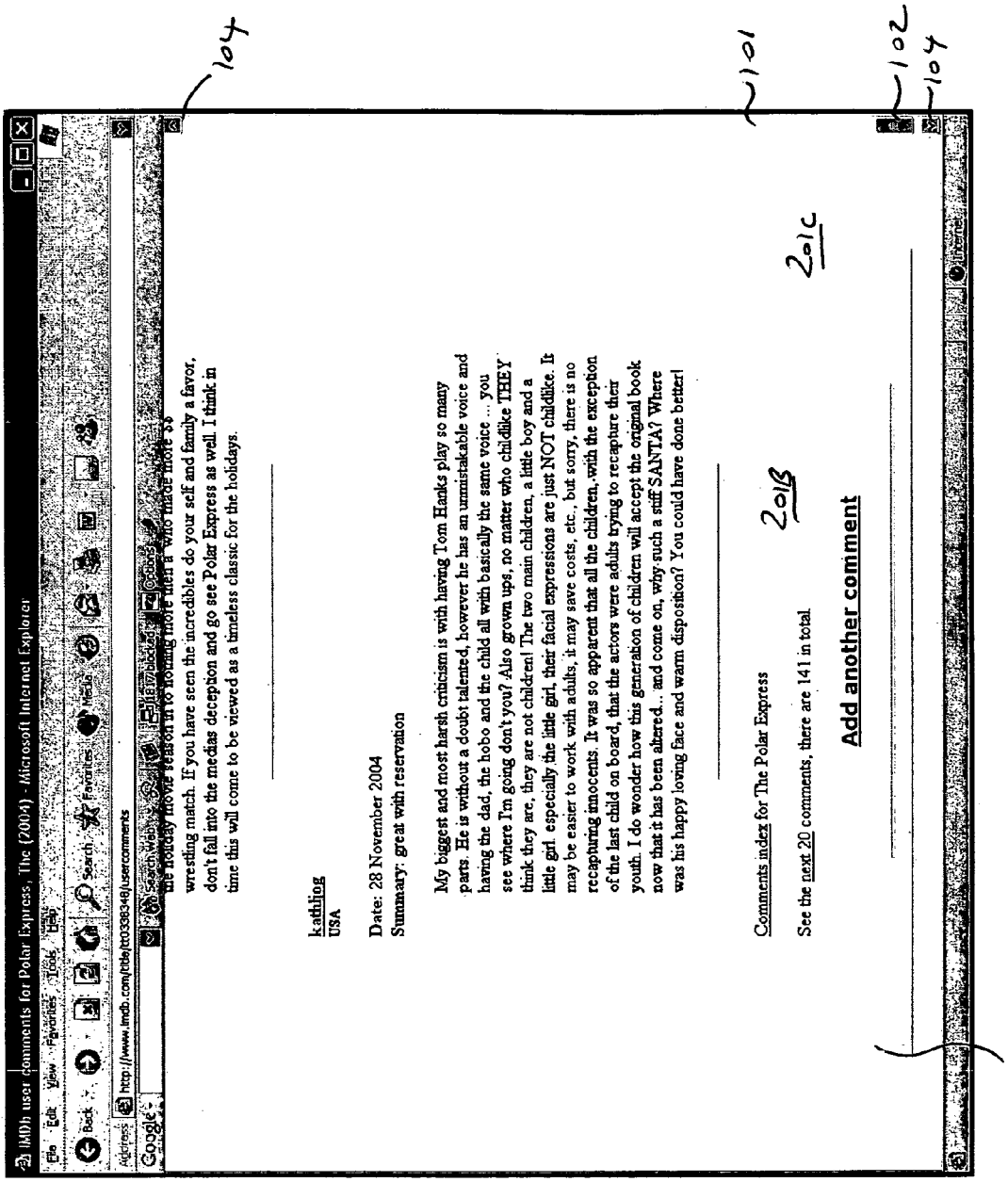

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

For illustrative purposes, the invention is described in connection with scrolling two panels in a vertical direction, using scroll bars that are similar to those of the Mac OS X operating system, from Apple Computer, Inc. Various specific details are set forth herein and in the Figures, to aid in understanding the present invention. However, such specific details are intended to be illustrative, and are not intended to restrict in any way the scope of the present invention as claimed herein. In particular, one skilled in the art will recognize that the invention can be used for scrolling in any direction, including horizontal scrolling, vertical scrolling, or a combination of the two, or the like. Furthermore, the present invention can be applied to scrolling in any number of dimensions, including for example one-, two-, or three-dimensional scrolling along any number of axes. Furthermore, one skilled in the art will recognize that the invention can be used for controlling the scrolling of any number of panels, and is not limited to a two-panel implementation. Finally, one skilled in the art will recognize that the invention can be used in connection with any input mechanism for initiating scrolling operations, including manipulation of on-screen scroll bars using a pointing device, keyboard control, voice control, mouse wheel, touch screen control, or the like, or any combination of the above. In addition, the particular screen layouts, appearance, and terminology as depicted and described herein, are intended to be illustrative and exemplary, and in no way limit the scope of the invention as claimed.

In one embodiment, the present invention is implemented in a conventional personal computer system, such as a Macintosh, (available from Apple Computer, Inc. of Cupertino, Calif.), running an operating system such as Mac OS X (also available from Apple Computer, Inc.). The invention may be embodied in software that runs on the personal computer. The invention may be included as add-on software, or it may form part of the operating system itself, or it may be a feature of an application that is bundled with the computer system or sold separately. The various features of the invention as described herein include output presented on a display screen that is connected to the personal computer. In addition, the invention makes use of input provided to the computer system via input devices such as a keyboard, mouse, touchpad, or the like. Such hardware components, including their operation and interactions with one another and with a central processing unit of the personal computer, are well known in the art of computer systems and therefore are not depicted here. Several Figures are presented as screen shots depicting examples of the user interface as it might appear on a display screen or other output device. In addition, the techniques described herein can be implemented in other types of devices, including mobile phones, personal digital assistants, television displays, kiosks, or the like.

For purposes of the following discussion, the term "panel" refers to one of the regions within a window for displaying content. The term "content" refers to text, images, movies, video, or any other visual content capable of being displayed within a panel; it may also refer to controls or user interface elements such as buttons, text fields, pop-up menus, and the like that may be displayed within a panel. The term "displayed content" refers to content that is currently visible within a panel. The term "underlying content" refers to the total amount of content of that portion of the underlying document (or other content) associated with a particular panel. Thus, the displayed content for a panel is at least a subset of the underlying content for that panel. Scrolling causes a different subset of the underlying content to be displayed.

For purposes of this description, the word "document" is used; however, one skilled in the art will recognize that the techniques of the present invention can be applied to any on-screen display wherein one or more scroll bars are used to control which part of a displayable region is currently shown on the screen. For example, the present invention can be used for scrolling in a display of on-screen icons in a program or operating system function for viewing and manipulating files.

According to the techniques described herein, a single scrollbar (or other user interface element) controls multiple panels. At certain times, all panels move in lock-step with one another in response to scroll commands; at other times, some panels move while others remain frozen in place. The determination as to whether a particular panel moves in response to a scroll command depends upon whether the movement would cause a blank (non-content) area of the panel to be displayed because no underlying content exists past the current scroll position. Specifically, if the scroll operation would cause a blank area of the panel to be displayed (because no further underlying content exists), the panel does not scroll, or scrolls less than the full scroll increment; conversely, if the scroll operation would cause additional content to be displayed (because underlying content does exist past the current scroll position), the panel does scroll.

As long the displayed portion of each panel contains some form of content, all panels scroll in lock-step with one another. However, if the scrolling action causes a panel to reach the end of its content, that panel does not scroll past the end of the content. The last portion of the content in that panel thus continues to be displayed even as other panel(s) continue to scroll. The panels therefore no longer move in lock-step with one another. In effect, the panel having the lesser linear measure of content (measured in a direction parallel to the scroll direction) ignores any scrolling action that would cause an area beyond its content to be displayed.

In one embodiment, if a scroll command is received, and underlying content for a panel does exist past the current scroll position, but the amount of remaining content is less than the increment of the scroll command, the panel is scrolled only to the end of the underlying content. In this situation, then, the panel scrolls by less than the indicated increment, so that the last portion of the underlying content for the panel will be displayed without any blank area. For example, if the user specifies a "page down" scroll command when less than a full page of underlying content for a panel exists past the current position, that panel scrolls by an amount less than a full page (even though other panels may scroll by a full page).

In one embodiment, the present invention operates in connection with scrolling operations according to any scroll increment. For example, the invention can operate in connection with line-by-line scrolling, page-by-page scrolling, or any other increment. A page can refer to any quantity of displayable data, including for example on-screen data corresponding to a printed page, or a window's worth of data (i.e., an amount of on-screen data that is visible within a window at a given time).

An example of multiple-panel scrolling according to the present invention is shown in FIGS. 4A through 4F, where the user controls the scroll position of a multiple-panel window 400. In the examples of FIG. 4A through 4F, window 400 is a news feed reader. Panel 401A shows excerpts from a number of news stories, while panel 401B contains various links and controls for navigating among news feeds and articles, and for searching among articles.

For illustrative purposes, the invention is described herein as a technique for controlling scroll positions for content and controls areas of a news feed browser. Accordingly, the present invention can be implemented in conjunction with the techniques and disclosure presented in the above-referenced related patent applications for "News Feed Viewer" and "News Feed Browser", which are hereby incorporated by reference:

Referring now also to FIGS. 5A through 5D, there is shown the relationship between displayed content and underlying content at several different scroll positions, according to one embodiment of the present invention. Display content is the content shown within panels 401A and 401B at a given point in time. Underlying content is the content of the underlying document (or other content) being displayed, divided in this example into content 501A for panel 401A and content 501B for panel 401B.

Figure 4A:
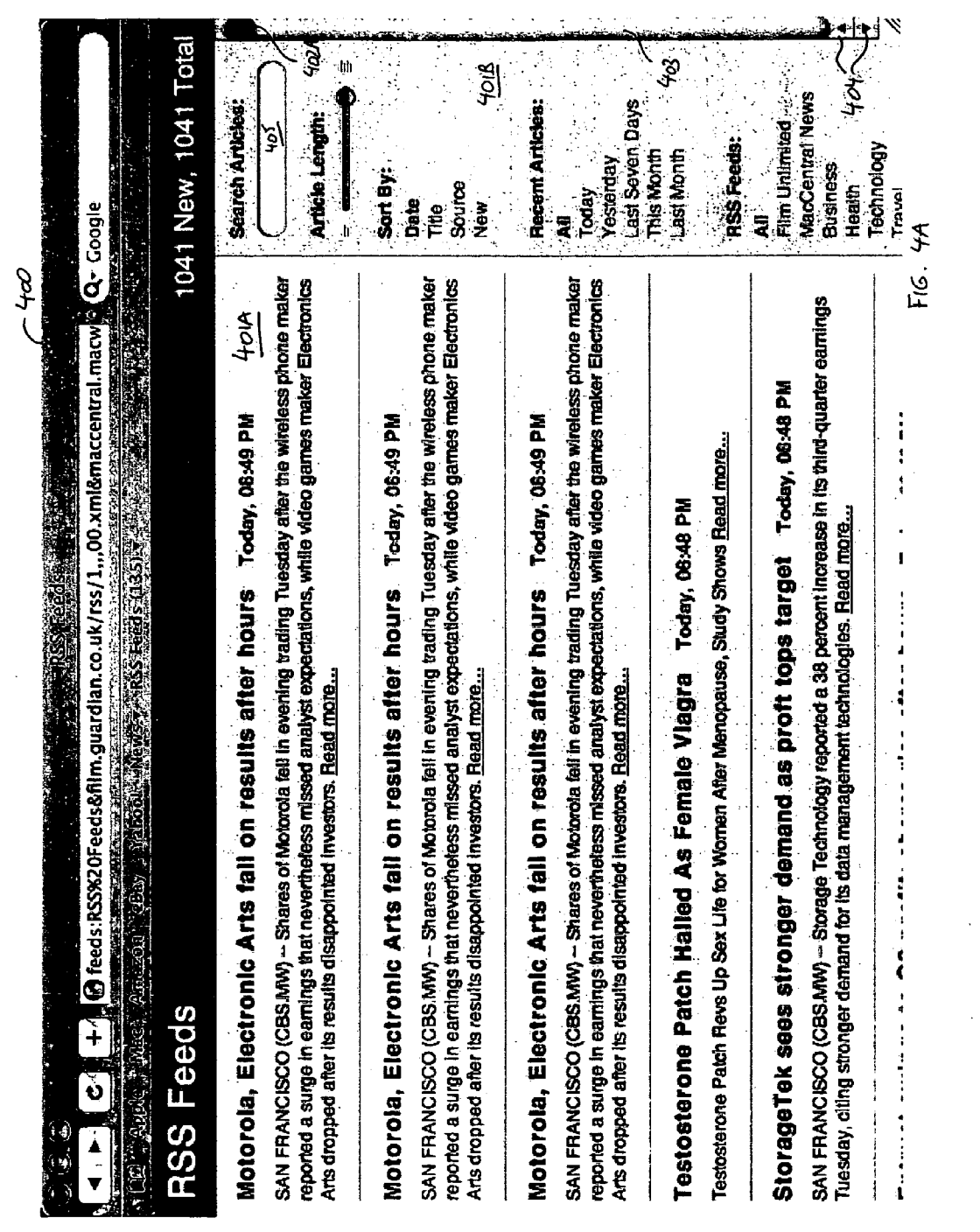
Figure 4B:
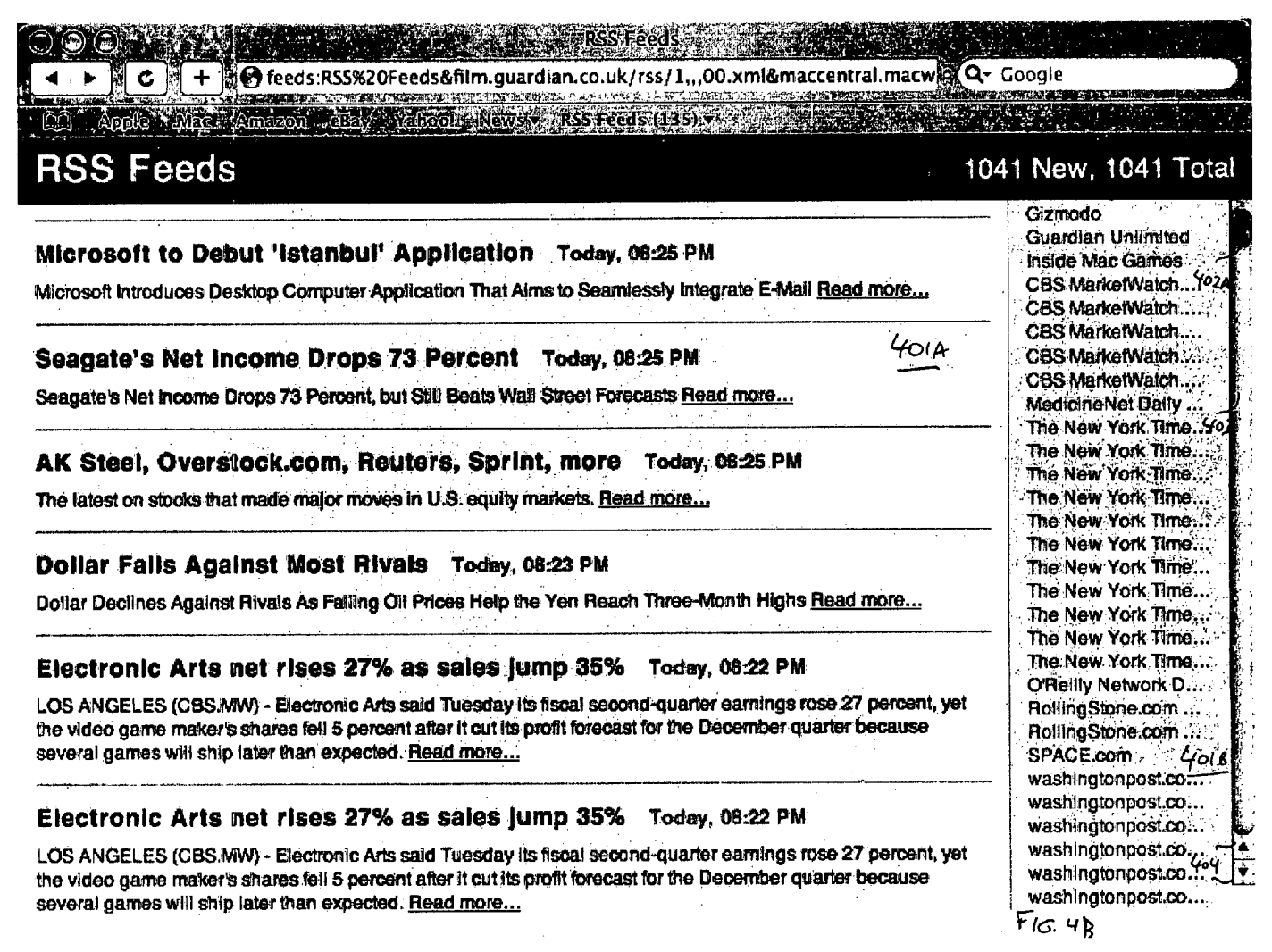
Figure 4C:
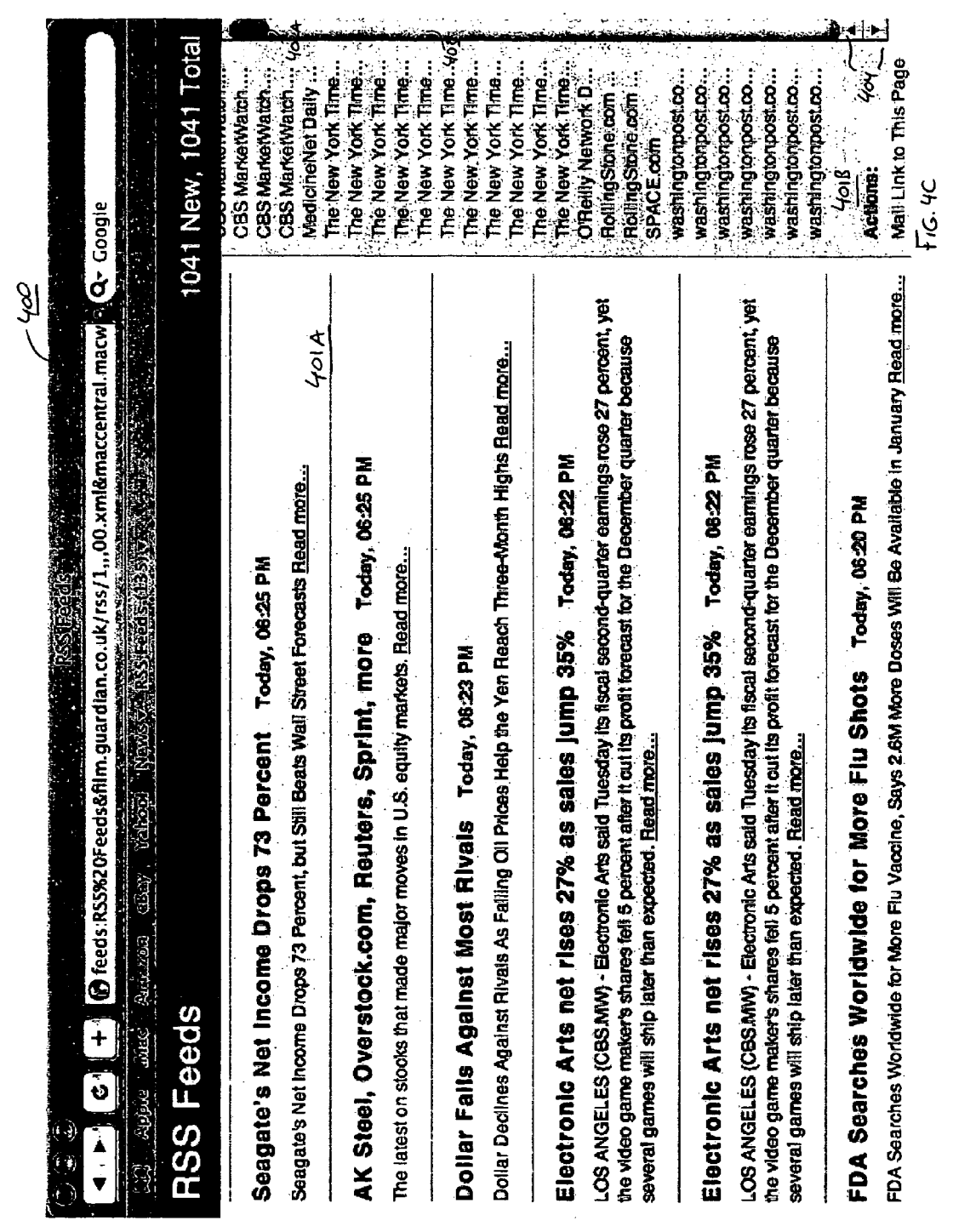
Figure 4F:
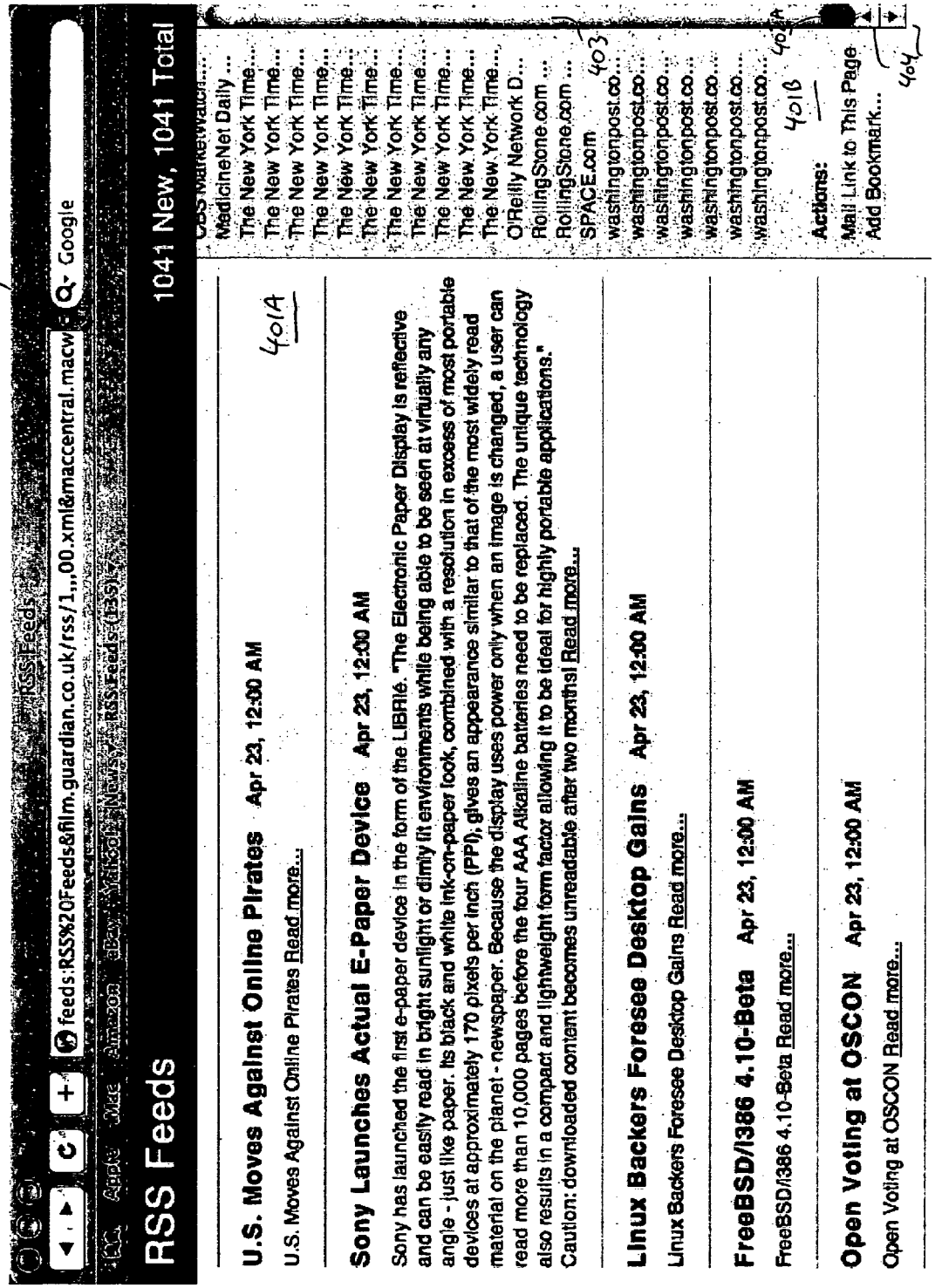
FIG. 4F is a screen shot depicting an example of a multiple-panel window at a bottom scroll position, illustrating that one of the panels has continued to scroll while the other panel is in the same scroll position as in FIG. 4E, according to an embodiment of the present invention.
Figure 1A:
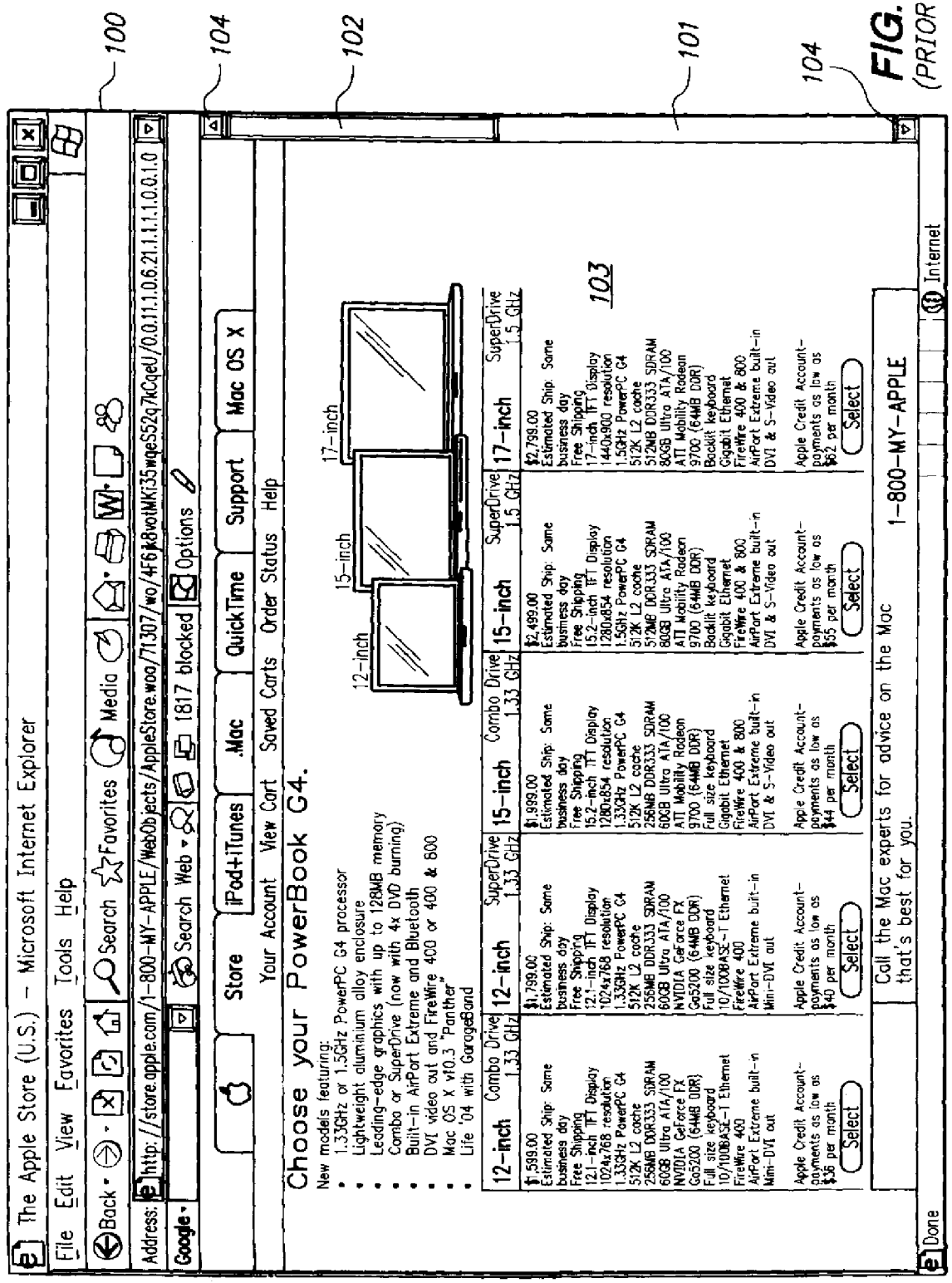
Figure 1B:
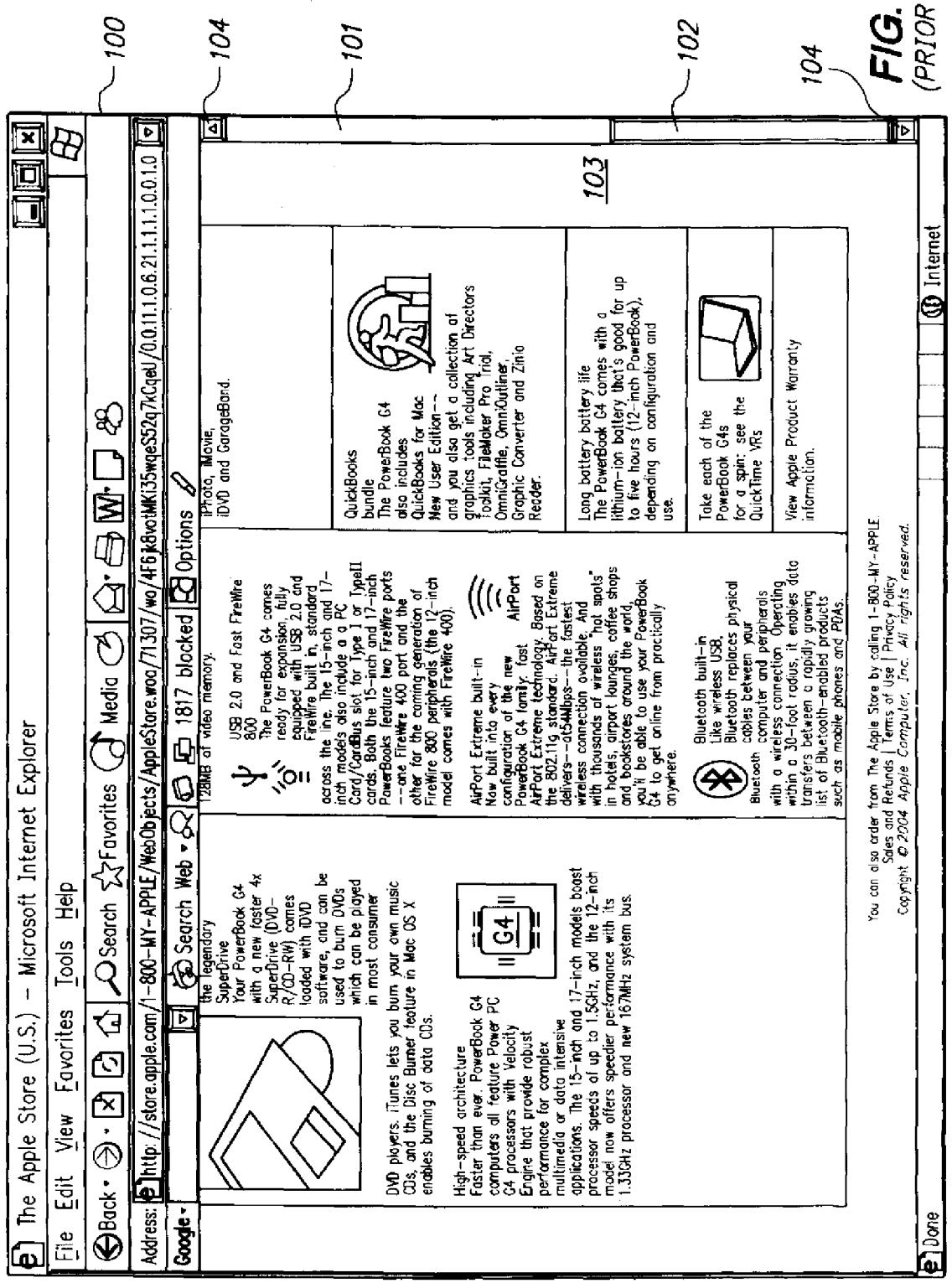
Figure 2:
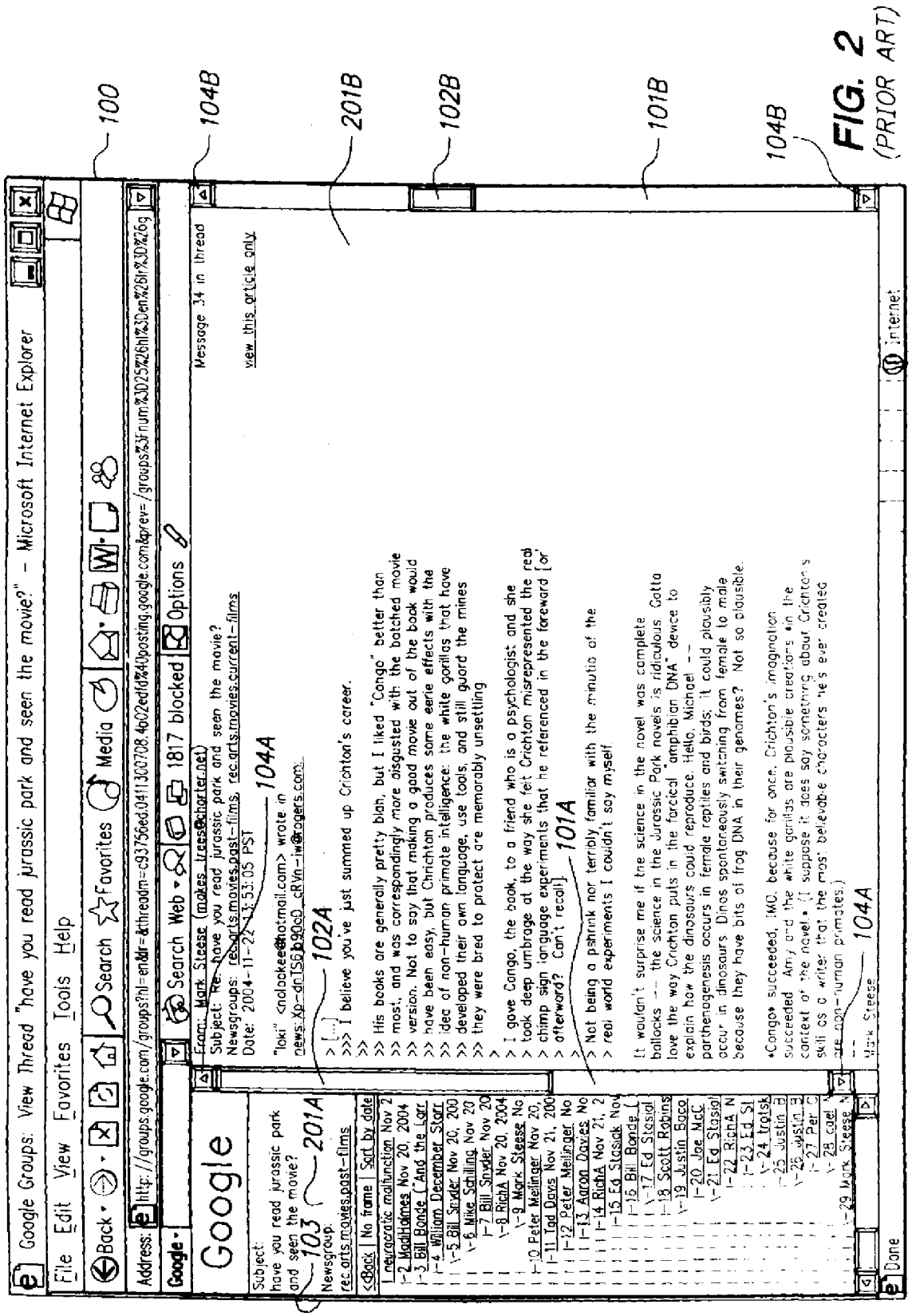
FIG. 2 is a screen shot depicting an example of a two-panel window where each panel is scrolled separately, according to the prior art.
Figure 3A:
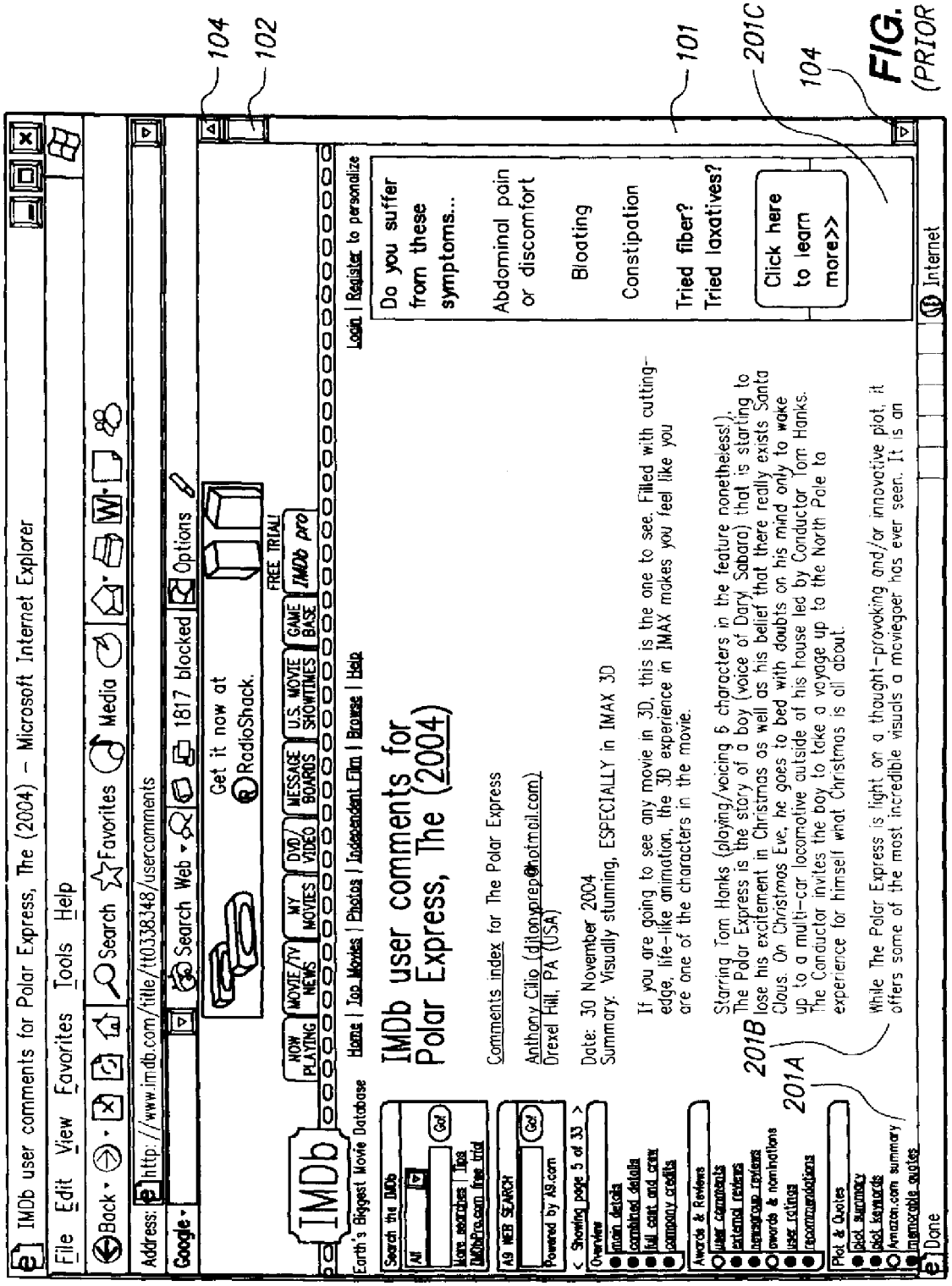
Figure 3B:
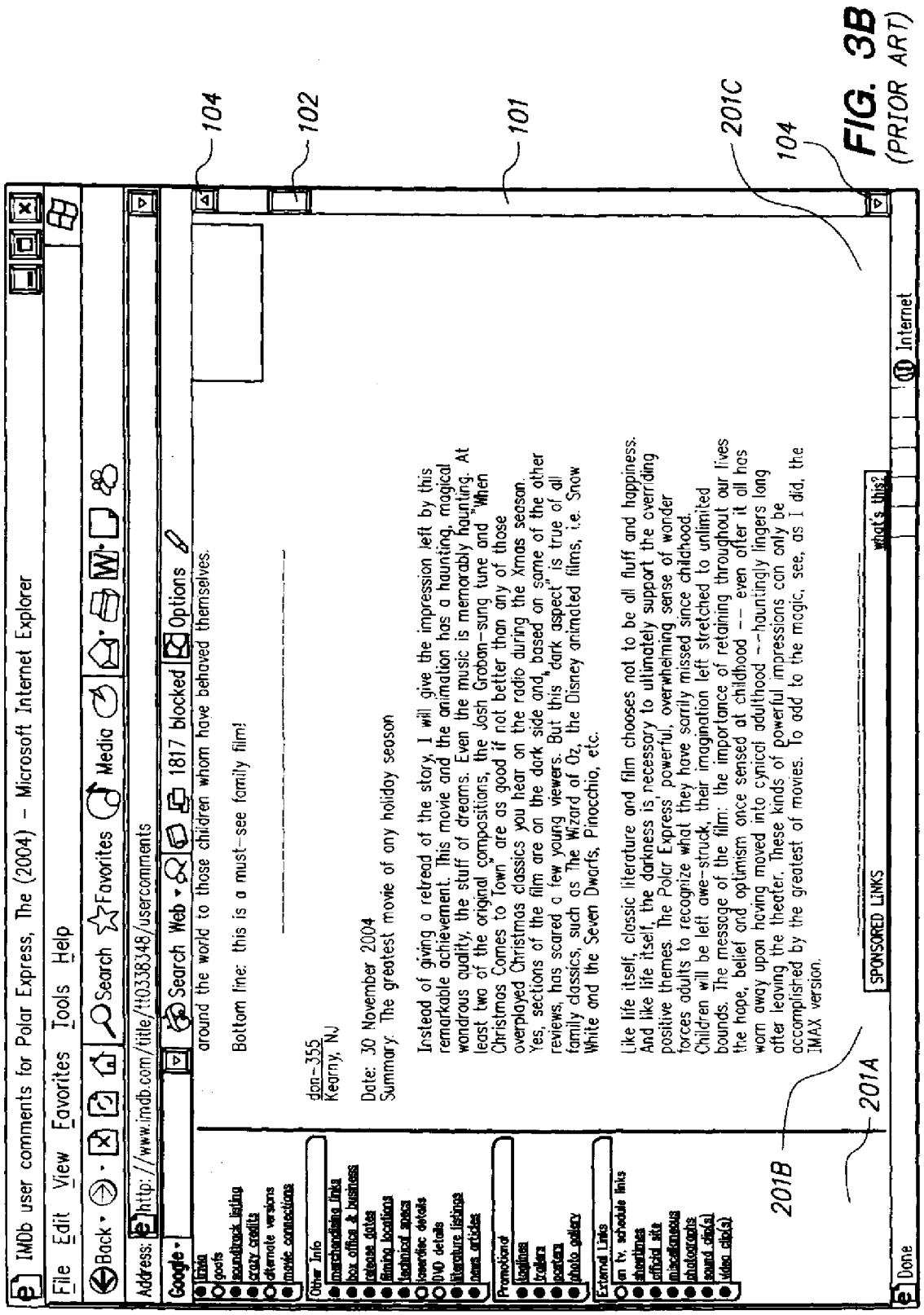
Figure 3C:
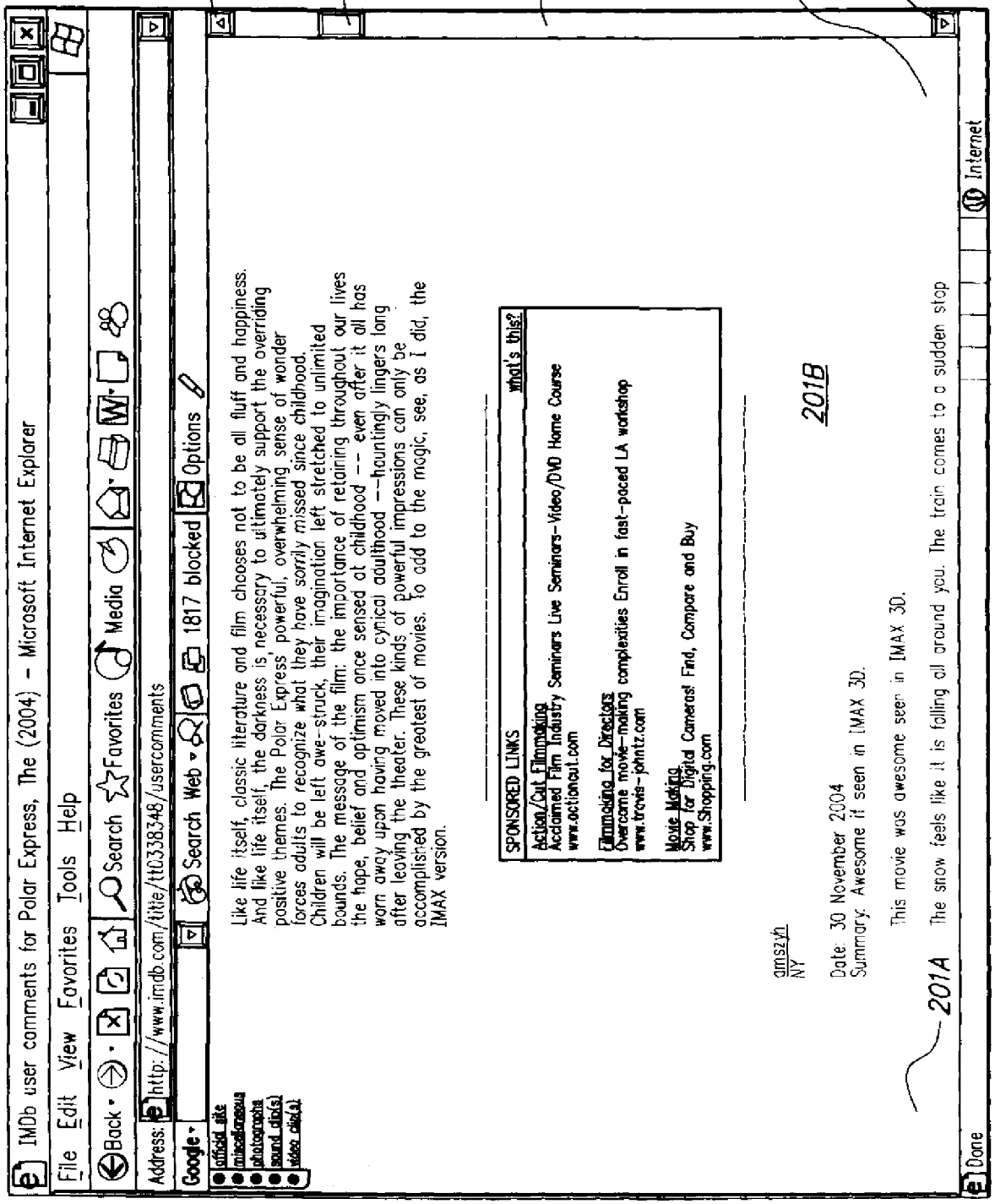
Figure 3D:
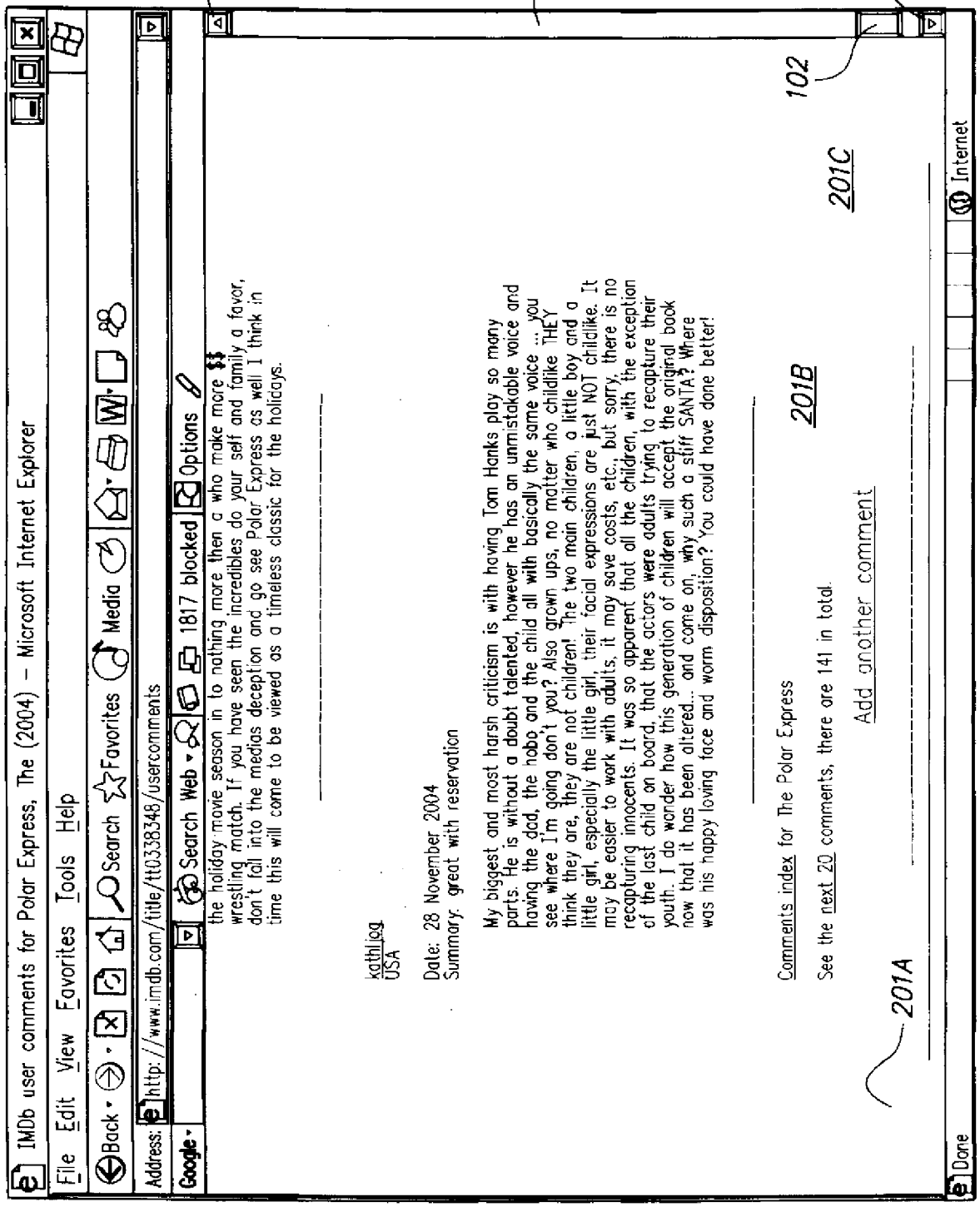
Figure 4E:
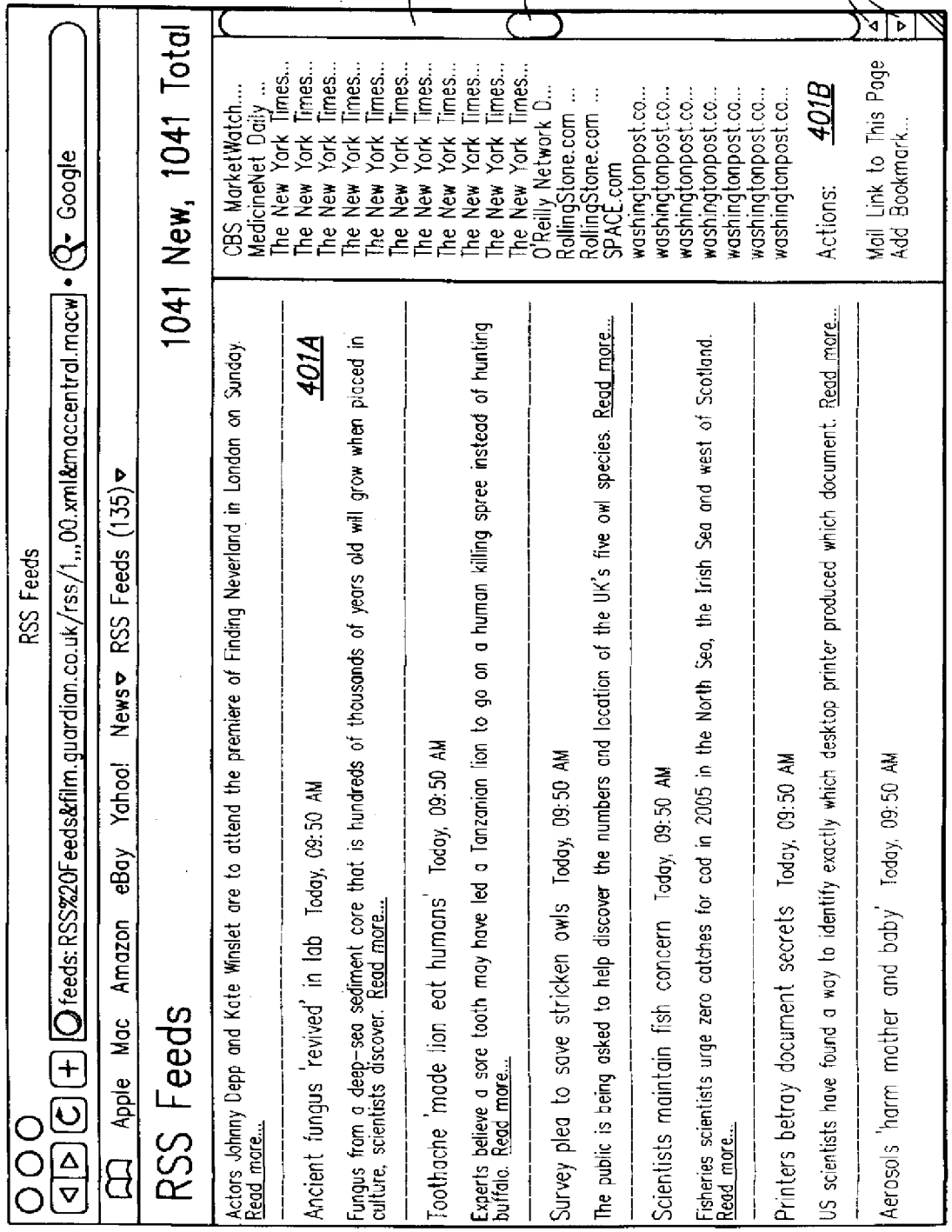
FIG. 4E is a screen shot depicting an example of a multiple-panel window at a fifth scroll position, where further scrolling will cause only one of the panels to scroll, while the other remains frozen in position, according to an embodiment of the present invention.
Figures 5A, 5B:
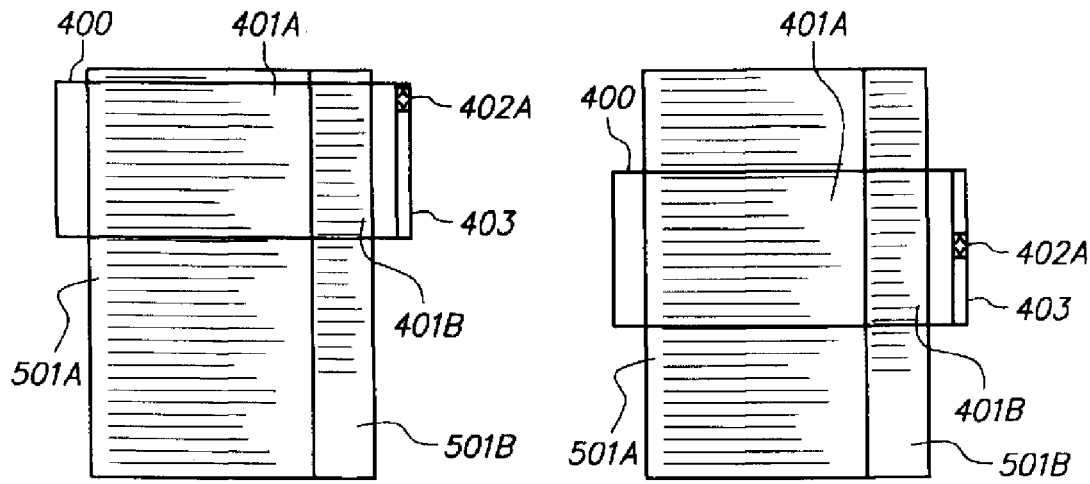
FIG. 5A depicts the relationship between displayed content and underlying content when a window is at a top scroll position, according to an embodiment of the present invention.
FIG. 5B depicts the relationship between displayed content and underlying content when a window is at a second scroll position, where further scrolling will cause only one of the panels to scroll, while the other remains frozen in position, according to an embodiment of the present invention.
Figures 5C, 5D:
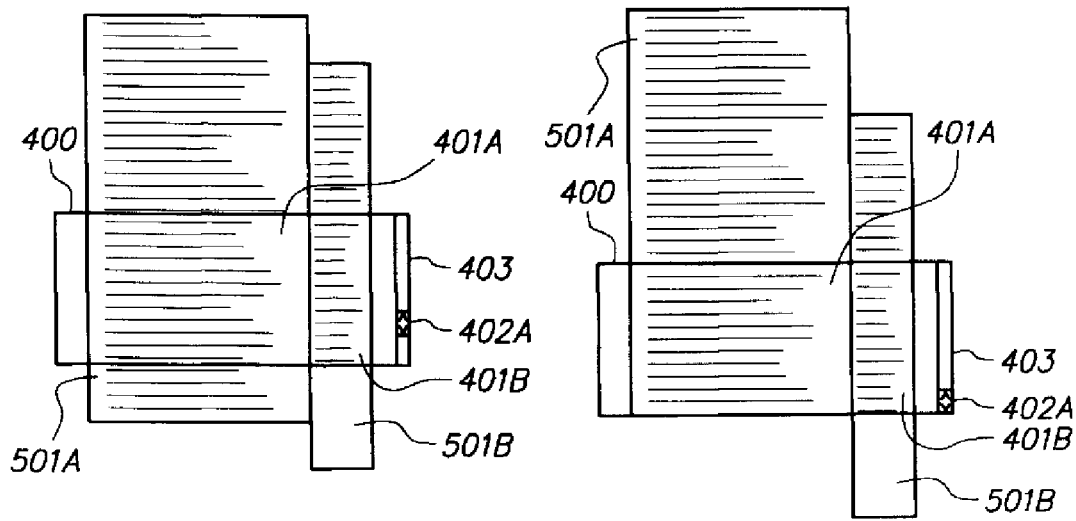
FIG. 5C depicts the relationship between displayed content and underlying content when a window is at a third scroll position, illustrating that one of the panels has continued to scroll while the other panel is in the same scroll position as in FIG. 5B, according to an embodiment of the present invention.
FIG. 5D depicts the relationship between displayed content and underlying content when a window is at a bottom scroll position, illustrating that one of the panels has continued to scroll while the other panel is in the same scroll position as in FIG. 5B, according to an embodiment of the present invention.

In the examples of FIGS. 4A through 4F and 5A through 5D, initially both panels 401A, 401B scroll in lock-step with one another in response to user manipulation of scroll bar 403, arrows 404, scroll thumb 402A, or other scroll position commands. Once one of the panels 401B has run out of content, so that further scrolling would cause a blank area to be displayed, that panel 401B is either frozen in place as the other panel 401A continues to scroll, or panel 401B is scrolled by an amount less than the full scroll increment. Conceptually, this is shown in FIGS. 5C and 5D as underlying content 501B sliding down with respect to underlying content 501A as the user scrolls past the point where no more underlying content 501B is available to be displayed in panel 401B.

In FIG. 5A, window 400 is at a top scroll position, as indicated by the position of scroll thumb 402A at the top of scroll bar 403. Referring also to FIG. 4A, there is shown an example of a screen shot for window 400 at this position. As is known in the art, the user can change the scroll position of window 400 by clicking on arrows 404, or by dragging scroll thumb 402A up or down, or by clicking on an area of scroll bar 403 above or below scroll thumb 402A, or by actuating certain keyboard commands, or by turning a mouse wheel, or the like. One skilled in the art will recognize that many other techniques are available for changing the scroll position. Some of these operations cause window 400 to scroll on a line-by-line basis; others cause window 400 to scroll on a page-by-page basis. If, in the position shown in FIGS. 4A and 5A, the user tries to scroll downward, both panels 401A and 402A scroll in concert with one another, since there is content below the currently displayed content in both panels 401A and 402A. If, in the position shown in FIGS. 4A and 5A, the user tries to scroll upward, nothing happens, since window 400 is already at a top scroll position.

Referring now to FIG. 4B, there is shown an example of a screen shot for window 400 after the user has caused window 400 to scroll down somewhat from the position shown in FIGS. 4A and 4B. Both panels 401A and 401B have scrolled in lock-step with one another, so that they both show new content. Scroll thumb 402A has moved to a new location within scroll bar 403, showing the relative scroll position of window 400. In one embodiment, the position of scroll thumb 402A indicates the relative scroll position with respect to the underlying content that has the longest measure along the same axis as scroll bar 403. In one embodiment, the size of scroll thumb 402A indicates what fraction of the underlying content is currently being displayed in window 400, again with respect to the underlying content that has the longest measure along the same axis as scroll bar 403. Thus, in the example shown, since underlying content 501A has a longer vertical measure than underlying content 501B, the position of scroll thumb 402A is based on the panel 401A content. Specifically, scroll thumb 402A indicates, at some level of approximation, how much of underlying content 501A is currently above and below the currently displayed content in panel 401A. It is important to note that the determination is not necessarily based on the total amount of underlying content 501A versus the total amount of underlying content 501B; rather it is based on comparison of the vertical measure of each underlying content. This distinction is important because differing column widths, font size, or other presentation attributes may cause one panel to have less total underlying content than that of a second panel but still have a longer vertical measure than that of the second panel.

FIG. 4C is similar to FIG. 4B, but shows window 400 after the user has caused the display to scroll down by a few more lines. Here, as in FIG. 4B, both panels 401A and 402A continue to scroll in concert with one another, since there is content below the currently displayed content in both panels 401A and 402A.

In FIG. 5B, the user has caused window 400 to scroll down somewhat, to a position where no additional underlying content 501B exists beyond the bottom edge of panel 401B. Referring also to FIG. 4D, there is shown an example of a screen shot for window 400 at this position. Up to this point, both panels 401A and 402A have been scrolling in concert with one another. However, if the user wishes to scroll further, panel 401B does not scroll, since there is no additional underlying content 501B to be shown in panel 401B.

In FIG. 5C, the user has caused window 400 to continue to scroll down past the point shown in FIG. 5B. Even as panel 401A has been updated to show different content in response to the scrolling operation, panel 401B displays the same content it did in FIG. 5B. The content of panel 401B has not shifted up within window 400 in concert with the content of panel 401A; indeed, the content of panel 401B has not moved or changed at all. According to an embodiment of the invention, as long as no additional underlying content 501B exists to be displayed in panel 401B, panel 401B does not scroll or move in response to downward scroll commands. Referring also to FIG. 4E, there is shown an example of a screen shot for window 400 at this position.

In FIG. 5D, the user has caused window 400 to scroll to the bottom of underlying content 501A. Even as panel 401A has been updated to show different content in response to the scrolling operation, panel 401B displays the same content it did in FIGS. 5B and 5C. The content of panel 401B has not shifted up within window 400 in concert with the content of panel 401A; indeed, the content of panel 401B has not moved or changed at all. Referring also to FIG. 4F, there is shown an example of a screen shot for window 400 at this position.

FIG. 4F is a screen shot depicting an example of a multiple-panel window at a bottom scroll position, illustrating that one of the panels has continued to scroll while the other panel is in the same scroll position as in FIG. 4E, according to an embodiment of the present invention.

In one embodiment, once the user has scrolled downward past the point of FIGS. 5B and 4D, upward scrolling has no effect on panel 401B until the user has scrolled sufficiently upward to return to the point of FIGS. 5B and 4D. Thus, there are effectively two possible states:

1) Scroll position is somewhere between the top position (FIGS. 4A and 5A) and the position where no additional underlying content 501B exists for panel 401B (FIGS. 4D and 5B): In this state, upward and downward scroll operations cause both panels 401A and 401B to scroll in concert with one another.

2) Scroll position is somewhere between the position where no additional underlying content 501B exists for panel 401B (FIGS. 4D and 5B) and the bottom position (FIGS. 5D and 4F): In this state, upward and downward scroll operations cause panel 401A to scroll, while panel 401B remains locked in place.

In an alternative embodiment, while in state #2, upward scrolling causes panel 401B to scroll upward in concert with panel 401A, as long as underlying content exists above the current scroll position. Then, once the user reaches a point were no more content exists above the current position, further upward scrolling causes panel 401A to scroll while panel 401B stays locked in position. Thus, in this embodiment, scrolling in any direction causes panel 401B to scroll as long as underlying content 501B exists beyond the current position in the direction of the scroll operation; if no underlying content 501B exists beyond the current position in the direction of the scroll operation, panel 401B stays locked in position.

In one embodiment, certain portions of panel 401B may be designated as locked in place, so that they remain in their initial position even when panel 401B is scrolled. For example, search box 405 may be locked at the top position, so that even while remaining portions of panel 401B scroll up or down within window 400, search box 405 stays at the position shown in FIG. 4A, so that it is always available to the user as long as window 400 is being displayed. In one embodiment, such behavior can be controllable by the user, for example via a preference screen. In another embodiment, the determination as to whether certain portions of a panel are locked in place may depend upon the amount of content being displayed and the total current size of window 400; for example, if window 400 is resized so that it is too small to effectively display its content, the system may override the locked-in status of certain elements. Other variations and enhancements will be apparent to one skilled in the art.

In addition, the invention can be implemented in a reverse orientation to that described, where the panel having the lesser linear measure of content is initially frozen in place, and only begins to move when it reaches a point where the remaining linear measure of underlying content equals the linear measure of underlying content for other columns.

Figure 6A:
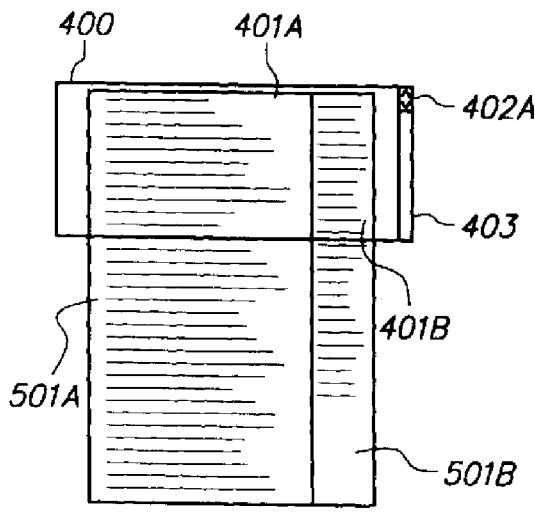
FIGS. 6A through 6D depict an alternative embodiment of the present invention, where the panel having the lesser linear measure of content is initially frozen in place.
Figure 6B:
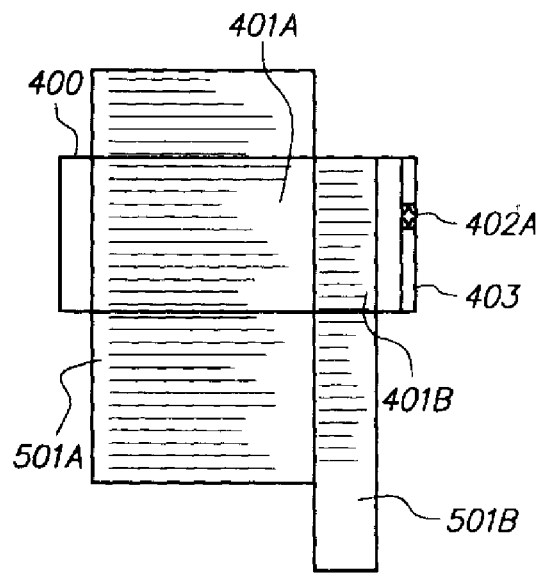
Figure 6C:
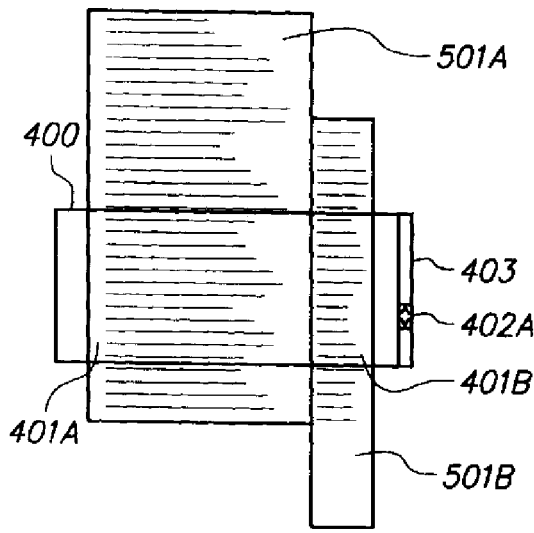
Figure 6D:
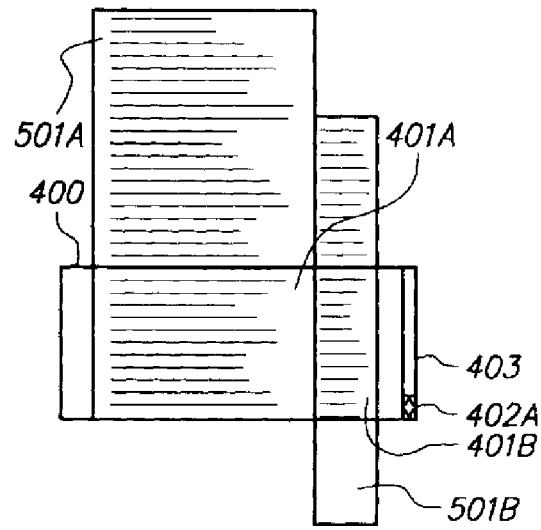

Such a variation is shown, for example, in FIGS. 6A through 6D. In FIG. 6A, window 400 is at a top scroll position, similar to that shown in FIG. 5A. As the user causes window 400 to scroll downward from this position, panel 401B remains locked in place and does not scroll, until the vertical measure of remaining underlying content 501B equals the vertical measure of remaining underlying content 501A, as shown in FIG. 6B. Once the point shown in FIG. 6B has been reached, both panels scroll in concert with another, as shown in FIG. 6C. In FIG. 6D, the bottom scroll position has been reached, and the bottom portions of underlying content 501A and 501B are displayed.

In another embodiment, any number of "lock points" can be established within the underlying content for a panel. These lock points are linked to underlying content for another panel. Both panels move in lock-step with one another, until a lock point is encountered for one of the panels. At that point, that panel's scroll position is locked (i.e., that panel does not scroll) until the corresponding lock point in the other panel appears. Then, lock-step scrolling resumes. This process is repeated each time a lock point is encountered.

Figure 7A:
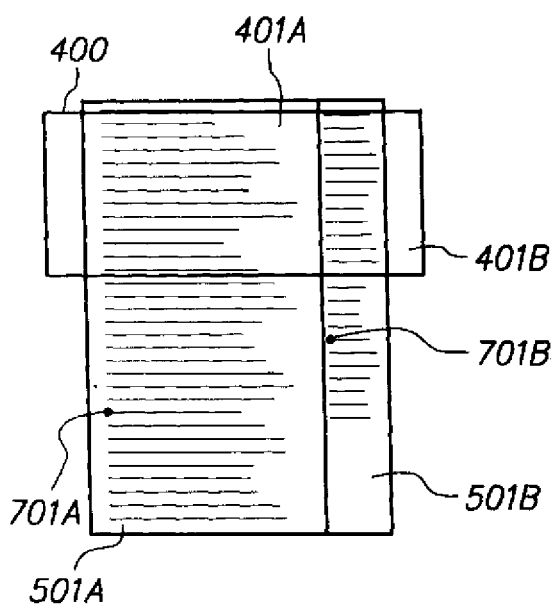
FIGS. 7A through 7D depict an alternative embodiment of the present invention, where scrolling operations are determined by lock points established for each panel.
Figure 7B:
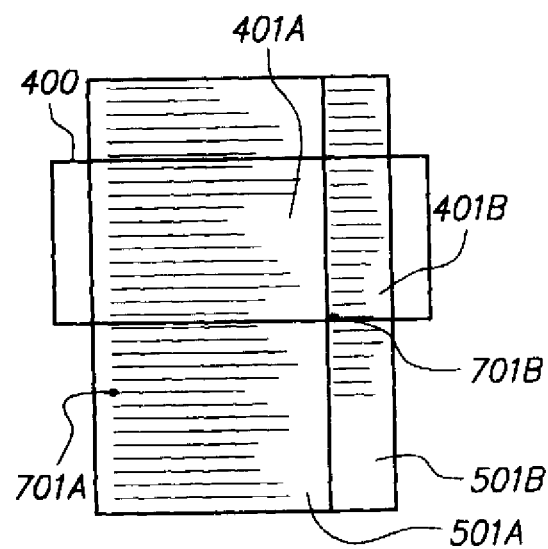
Figure 7C:
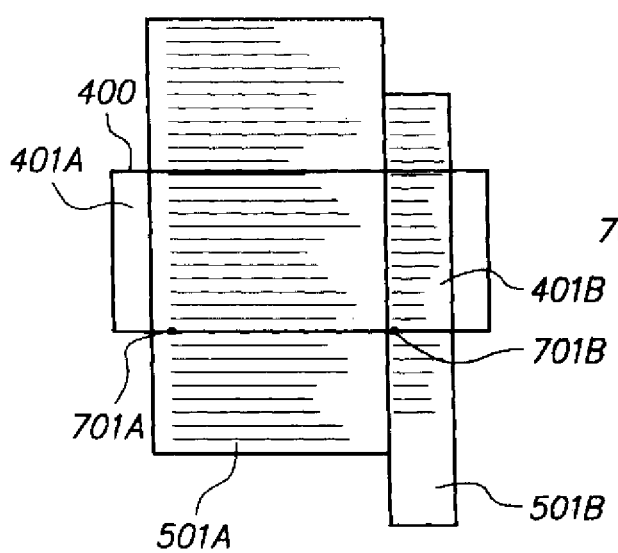
Figure 7D:
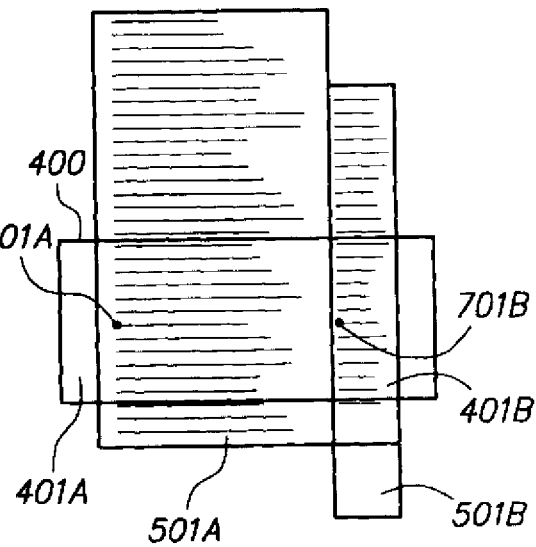

Such a variation is shown, for example, in FIGS. 7A through 7D. In FIG. 7A, window 400 is at a top scroll position, similar to that shown in FIG. 5A. Lock point 701B in content 501B is linked with lock point 701A in content 501A. Initially, both panels scroll in lock-step with one another, as described above. Once lock point 701B is encountered, as shown in FIG. 7B, panel 401B becomes locked and stops scrolling, even as panel 401A continues to scroll. Upon further scrolling, lock point 701A is encountered, as shown in FIG. 7C. At that point, lock-step scrolling resumes, with lock points 701A and 701B being horizontally aligned with each other as they move up within window 400. In FIG. 7D, the end of underlying content 501B is reached, so panel 401B becomes locked again and does not scroll as panel 501A continues to scroll, according to techniques described above.

In the above description, for purposes of explanation, numerous specific details are set forth in order to provide a thorough understanding of the invention. It will be apparent, however, to one skilled in the art that the invention can be practiced without these specific details. For example, the present invention can be applied to scrolling in any direction or combination of directions, and is not limited to vertical scrolling. In addition, the invention can be applied to windows having any number of panels, and is not limited to windows having two panels.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for scrolling a plurality of panels in a window, comprising:

displaying at least a portion of underlying content in each panel;

receiving a scroll command having a scroll direction;

scrolling a first panel having a greatest linear measure of underlying content among the panels in the window; and for a second panel:

responsive to the linear measure of any additional undisplayed underlying content for the second panel in the scroll direction being greater than or equal to the linear measure of any additional undisplayed underlying content for the first panel in the scroll direction, scrolling the second panel in concert with the scrolling of the first panel; and responsive to the linear measure of any additional undisplayed underlying content for the second panel in the scroll direction being less than the linear measure of any additional undisplayed underlying content for the first panel in the scroll direction, maintaining the scroll position of the second panel.

2. A method for scrolling a plurality of panels in a window, at least two panels being associated with underlying content including at least one lock point, comprising:

displaying at least a portion of underlying content in each panel;

receiving a scroll command having a scroll direction; and for each panel:

responsive to encountering a lock point in the underlying content for a first panel and not encountering a corresponding lock point in the underlying content for a second panel, scrolling the second panel while maintaining the scroll position of the first panel;

responsive to encountering a lock point in the underlying content for the second panel and not encountering a corresponding lock point in the underlying content for the first panel, scrolling the first panel while maintaining the scroll position of the second panel; and responsive to encountering lock points in all panels, for each panel:

responsive to additional undisplayed underlying content existing in the scroll direction, scrolling the panel according to the scroll command; and responsive to no additional undisplayed underlying content existing in the scroll direction, maintaining the scroll position of the panel; and responsive to not having encountering lock points in any panels, for each panel:

responsive to additional undisplayed underlying content existing in the scroll direction, scrolling the panel according to the scroll command; and responsive to no additional undisplayed underlying content existing in the scroll direction, maintaining the scroll position of the panel.

3. The method of claim 1 or 2, wherein the scroll command has a scroll increment, and wherein scrolling the panel comprises scrolling the panel by an amount equal to the scroll increment.

4. The method of claim 3, wherein the scroll increment comprises a line of text.

5. The method of claim 3, wherein the scroll increment comprises an amount of on-screen data that is visible on-screen at a given time.

6. The method of claim 3, wherein the scroll increment comprises an amount of on-screen data corresponding to a printed page of a given size.

7. The method of claim 1 or 2, wherein the scroll command has a scroll increment, and wherein scrolling the panel according to the scroll command comprises:

responsive to the linear measure of the additional undisplayed underlying content in the scroll direction being greater than or equal to the scroll increment, scrolling the panel by an amount equal to the scroll increment; and responsive to the linear measure of the additional undisplayed underlying content in the scroll direction being less than the scroll increment, scrolling the panel by an amount less than the scroll increment but sufficient to display the additional undisplayed underlying content in the scroll direction.

8. The method of claim 1 or 2, wherein the scroll direction is a vertical direction.

9. The method of claim 1 or 2, wherein the scroll direction is a horizontal direction.

10. The method of claim 1 or 2, wherein receiving a scroll command comprises receiving input indicating user interaction with a scroll bar.

11. The method of claim 1 or 2, wherein scrolling a panel comprises scrolling a first portion of the contents of the panel while maintaining the position of a second portion of the contents of the panel.

12. The method of claim 1 or 2, wherein a first panel comprises news feed content and a second panel comprises news feed topics.

13. The method of claim 1 or 2, wherein a first panel comprises news feed content and a second panel comprises at least one news feed control.

14. A computer program product for scrolling a plurality of panels in a window, comprising:

a computer-readable medium; and computer program code, encoded on the medium, for:

displaying at least a portion of underlying content in each panel;

receiving a scroll command having a scroll direction;

scrolling a first panel having a greatest linear measure of underlying content among the panels in the window; and for a second panel:

responsive to the linear measure of any additional undisplayed underlying content for the second panel in the scroll direction being greater than or equal to the linear measure of any additional undisplayed underlying content for the first panel in the scroll direction, scrolling the second panel in concert with the scrolling of the first panel; and responsive to the linear measure of any additional undisplayed underlying content for the second panel in the scroll direction being less than the linear measure of any additional undisplayed underlying content for the first panel in the scroll direction, maintaining the scroll position of the second panel.

15. A computer program product for scrolling a plurality of panels in a window, at least two panels being associated with underlying content including at least one lock point, comprising:

a computer-readable medium; and computer program code, encoded on the medium, for:

displaying at least a portion of underlying content in each panel;

receiving a scroll command having a scroll direction; and for each panel:

responsive to encountering a lock point in the underlying content for a first panel and not encountering a corresponding lock point in the underlying content for a second panel, scrolling the second panel while maintaining the scroll position of the first panel;

responsive to encountering a lock point in the underlying content for the second panel and not encountering a corresponding lock point in the underlying content for the first panel, scrolling the first panel while maintaining the scroll position of the second panel; and responsive to encountering lock points in all panels, for each panel:
  responsive to additional undisplayed underlying content existing in the scroll direction, scrolling the panel according to the scroll command; and
  responsive to no additional undisplayed underlying content existing in the scroll direction, maintaining the scroll position of the panel; and responsive to not having encountering lock points in any panels, for each panel:
  responsive to additional undisplayed underlying content existing in the scroll direction, scrolling the panel according to the scroll command; and
  responsive to no additional undisplayed underlying content existing in the scroll direction, maintaining the scroll position of the panel.

16. The computer program product of claim 14 or 15, wherein the scroll command has a scroll increment, and wherein the computer program code for scrolling the panel comprises computer program code for scrolling the panel by an amount equal to the scroll increment.

17. The computer program product of claim 16, wherein the scroll increment comprises a line of text.

18. The computer program product of claim 16, wherein the scroll increment comprises an amount of on-screen data that is visible on-screen at a given time.

19. The computer program product of claim 16, wherein the scroll increment comprises an amount of on-screen data corresponding to a printed page of a given size.

20. The computer program product of claim 14 or 15, wherein the scroll command has a scroll increment, and wherein the computer program code for scrolling the panel according to the scroll command comprises computer program code for:
  responsive to the linear measure of the additional undisplayed underlying content in the scroll direction being greater than or equal to the scroll increment, scrolling the panel by an amount equal to the scroll increment; and
  responsive to the linear measure of the additional undisplayed underlying content in the scroll direction being less than the scroll increment, scrolling the panel by an amount less than the scroll increment but sufficient to display the additional undisplayed underlying content in the scroll direction.

21. The computer program product of claim 14 or 15, wherein the scroll direction is a vertical direction.

22. The computer program product of claim 14 or 15, wherein the scroll direction is a horizontal direction.

23. The computer program product of claim 14 or 15, wherein the computer program code for receiving a scroll command comprises computer program code for receiving input indicating user interaction with a scroll bar.

24. The computer program product of claim 14 or 15, wherein the computer program code for scrolling a panel comprises computer program code for scrolling a first portion of the contents of the panel while maintaining the position of a second portion of the contents of the panel.

25. The computer program product of claim 14 or 15, wherein a first panel comprises news feed content and a second panel comprises news feed topics.

26. The computer program product of claim 14 or 15, wherein a first panel comprises news feed content and a second panel comprises at least one news feed control.

27. A system for scrolling a plurality of panels in a window, comprising:
  a display comprising a plurality of panels, for displaying at least a portion of underlying content in each panel;
  an input device, for receiving a scroll command having a scroll direction;
  a processor coupled to the display and input device, for processing scroll commands received via the input device and for generating output data for use by the display;
  wherein the display:
    scrolls a first panel having a greatest linear measure of underlying content among the panels in the window; and
    for a second panel:
      responsive to the linear measure of any additional undisplayed underlying content for the second panel in the scroll direction being greater than or equal to the linear measure of any additional undisplayed underlying content for the first panel in the scroll direction, the display scrolls the second panel in concert with the scrolling of the first panel; and
      responsive to the linear measure of any additional undisplayed underlying content for the second panel in the scroll direction being less than the linear measure of any additional undisplayed underlying content for the first panel in the scroll direction, the display maintains the scroll position of the second panel.

28. A system for scrolling a plurality of panels in a window, at least two panels being associated with underlying content including at least one lock point, comprising:
  a display comprising a plurality of panels, for displaying at least a portion of underlying content in each panel;
  an input device, for receiving a scroll command having a scroll direction; and
  a processor coupled to the display and input device, for processing scroll commands received via the input device and for generating output data for use by the display;
  wherein, for each panel:
    responsive to encountering a lock point in the underlying content for a first panel and not encountering a corresponding lock point in the underlying content for a second panel, the display scrolls the second panel while maintaining the scroll position of the first panel;
    responsive to encountering a lock point in the underlying content for the second panel and not encountering a corresponding lock point in the underlying content for the first panel, the display scrolls the first panel while maintaining the scroll position of the second panel; and
    responsive to encountering lock points in all panels, for each panel:
      responsive to additional undisplayed underlying content existing in the scroll direction, the display scrolls the panel according to the scroll command; and
      responsive to no additional undisplayed underlying content existing in the scroll direction, the display maintains the scroll position of the panel; and
    responsive to not having encountering lock points in any panels, for each panel:

responsive to additional undisplayed underlying content existing in the scroll direction, the display scrolls the panel according to the scroll command; and responsive to no additional undisplayed underlying content existing in the scroll direction, the display maintains the scroll position of the panel.

29. The system of claim 27 or 28, wherein the scroll command has a scroll increment, and wherein the display scrolls the panel by an amount equal to the scroll increment.

30. The system of claim 29, wherein the scroll increment comprises a line of text.

31. The system of claim 29, wherein the scroll increment comprises an amount of on-screen data that is visible on-screen at a given time.

32. The system of claim 29, wherein the scroll increment comprises an amount of on-screen data corresponding to a printed page of a given size.

33. The system of claim 27 or 28, wherein the scroll command has a scroll increment, and wherein:

responsive to the linear measure of the additional undisplayed underlying content in the scroll direction being greater than or equal to the scroll increment, the display scrolls the panel by an amount equal to the scroll increment; and responsive to the linear measure of the additional undisplayed underlying content in the scroll direction being less than the scroll increment, the display scrolls the panel by an amount less than the scroll increment but sufficient to display the additional undisplayed underlying content in the scroll direction.

34. The system of claim 27 or 28, wherein the scroll direction is a vertical direction.

35. The system of claim 27 or 28, wherein the scroll direction is a horizontal direction.

36. The system of claim 27 or 28, wherein the input device receives input indicating user interaction with a scroll bar.

37. The system of claim 27 or 28, wherein the display scrolls a first portion of the contents of the panel while maintaining the position of a second portion of the contents of the panel.

38. The system of claim 27 or 28, wherein a first panel comprises news feed content and a second panel comprises news feed topics.

39. The system of claim 27 or 28, wherein a first panel comprises news feed content and a second panel comprises at least one news feed control.

40. A method for scrolling a plurality of panels in a window, at least two panels being associated with underlying content including at least one lock point, comprising:

displaying at least a portion of underlying content in each panel;

receiving a scroll command having a scroll direction; and for each panel:

responsive to encountering a lock point in the underlying content for a first panel and not encountering a corresponding lock point in the underlying content for a second panel, scrolling the second panel while maintaining the scroll position of the first panel; and responsive to encountering a lock point in the underlying content for the second panel and not encountering a corresponding lock point in the underlying content for the first panel, scrolling the first panel while maintaining the scroll position of the second panel.

41. A method for scrolling a plurality of panels in a window, at least two panels being associated with underlying content including at least one lock point, comprising:

displaying at least a portion of underlying content in each panel;

receiving a scroll command having a scroll direction; and responsive to encountering lock points in all panels, for each panel:

responsive to additional undisplayed underlying content existing in the scroll direction, scrolling the panel according to the scroll command; and responsive to no additional undisplayed underlying content existing in the scroll direction, maintaining the scroll position of the panel.

* * * * *

UNITED STATES PATENT AND TRADEMARK OFFICE
CERTIFICATE OF CORRECTION

PATENT NO.        : 7,428,709 B2
APPLICATION NO.   : 11/105771
DATED             : September 23, 2008
INVENTOR(S)       : Scott James Forstall et al.

Page 1 of 18

It is certified that error appears in the above-identified patent and that said Letters Patent is hereby corrected as shown below:

The title page showing the illustrative figure should be deleted and substitute therefore the attached title page.

The sheets of drawings consisting of figures 1-7 should be deleted to appear as per attached figures 1-7.

Signed and Sealed this
Seventeenth Day of January, 2012

David J. Kappos
*Director of the United States Patent and Trademark Office*

(12) United States Patent
Forstall et al.

(10) Patent No.: US 7,428,709 B2
(45) Date of Patent: Sep. 23, 2008

(54) MULTIPLE-PANEL SCROLLING

(75) Inventors: Scott James Forstall, Mountain View, CA (US); Gregory N. Christie, San Jose, CA (US); Kevin John Tiene, Cupertino, CA (US); Donald Dale Melton, San Carlos, CA (US); Stephen Lemay, San Francisco, CA (US); Wayne Russell Loofbourrow, San Jose, CA (US); Jessica Kahn, San Francisco, CA (US); David Hyatt, Mountain View, CA (US)

(73) Assignee: Apple Inc., Cupertino, CA (US)

(*) Notice: Subject to any disclaimer, the term of this patent is extended or adjusted under 35 U.S.C. 154(b) by 528 days.

(21) Appl. No.: 11/105,771

(22) Filed: Apr. 13, 2005

(65) Prior Publication Data
US 2006/0236261 A1 Oct. 19, 2006

(51) Int. Cl.
G06F 3/048 (2006.01)

(52) U.S. Cl. .................. 715/784; 715/785; 715/786; 715/792

(58) Field of Classification Search .......... 715/786, 715/784, 785, 792
See application file for complete search history.

(56) References Cited

U.S. PATENT DOCUMENTS

| | | | | |
|---|---|---|---|---|
| 5,877,760 A * | 3/1999 | Onda et al. | ........... | 715/784 |
| 5,943,051 A * | 8/1999 | Onda et al. | ........... | 715/786 |
| 5,999,176 A * | 12/1999 | Kamper | ........... | 715/787 |
| 6,020,887 A * | 2/2000 | Loring et al. | ........... | 715/786 |
| 6,141,007 A * | 10/2000 | Lebling et al. | ........... | 715/792 |
| 6,157,381 A * | 12/2000 | Bates et al. | ........... | 715/786 |
| 6,430,574 B1 * | 8/2002 | Stead | ........... | 707/104.1 |
| 6,473,101 B1 * | 10/2002 | Grigor et al. | ........... | 715/784 |
| 6,614,454 B1 * | 9/2003 | Livingston | ........... | 715/781 |
| 6,778,192 B2 * | 8/2004 | Arbab et al. | ........... | 715/786 |
| 6,912,694 B1 * | 6/2005 | Harrison et al. | ........... | 715/784 |
| 7,114,129 B2 * | 9/2006 | Awada et al. | ........... | 715/786 |
| 2002/0186251 A1 * | 12/2002 | Himmel et al. | ........... | 345/784 |
| 2004/0216056 A1 * | 10/2004 | Tootill | ........... | 715/786 |
| 2006/0174214 A1 * | 8/2006 | McKee et al. | ........... | 715/802 |
| 2006/0174242 A1 * | 8/2006 | Cok | ........... | 715/786 |

OTHER PUBLICATIONS

Microsoft Computer Dictionary, 2002, Microsoft Press, Fifth Edition, p. 467.*
Temple, B., "The Complete Idiot's Guide to Microsoft Outlook 2000," Que, 1999. [online] [Retrieved on May 16, 2007] <URL:http://www.netlibrary.com/nlreader.dll?bookid=8128&filename=Page_ii.html>.
"Microsoft Outlook 2000 SP-3," Microsoft Corporation, 1995-1999, 16 Pages.

* cited by examiner

*Primary Examiner*—Tadesse Hailu
*Assistant Examiner*—Nicholas S Ulrich
(74) *Attorney, Agent, or Firm*—Fenwick & West LLP

(57) ABSTRACT

In a scrollable user interface window including two or more panels, a single scroll bar scrolls all of the panels. Panels move in lock-step with one another at certain times, but not at other times, depending on whether the lock-step scrolling would cause blank areas to be displayed. If the user's scroll commands would result in a blank area of a panel being displayed, the scroll command is not performed; rather, the panel remains frozen in its current position, even while other panel(s) do scroll. Thus, the present invention ensures that useful content is displayed at all times in all panels, and no screen real estate is wasted due to scrolling operations.

41 Claims, 16 Drawing Sheets

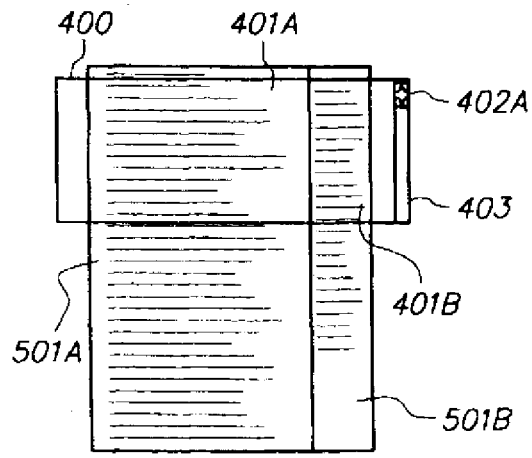

FIG. 4A

*(Screenshot of an RSS Feeds browser window, numbered 400, showing elements 401A, 401B, 402A, 403, 404, 405)*

Address bar: feeds:RSS%2Ffeeds&film.guardian.co.uk/rss/1,,00.xml&maccentral.macw • Google Bookmarks: Apple Mac Amazon eBay Yahoo! News▽ RSS Feeds (135)▽

RSS Feeds — 1041 New, 1041 Total

Motorola, Electronic Arts fall on results after hours Today, 06:49 PM
SAN FRANCISCO (CBS.MW) — Shares of Motorola fell in evening trading Tuesday after the wireless phone maker reported a surge in earnings that nevertheless missed analyst expectations, while video games maker Electronics Arts dropped after its results disappointed investors. Read more...

Motorola, Electronic Arts fall on results after hours Today, 06:49 PM
SAN FRANCISCO (CBS.MW) — Shares of Motorola fell in evening trading Tuesday after the wireless phone maker reported a surge in earnings that nevertheless missed analyst expectations, while video games maker Electronics Arts dropped after its results disappointed investors. Read more...

Motorola, Electronic Arts fall on results after hours Today, 06:49 PM
SAN FRANCISCO (CBS.MW) — Shares of Motorola fell in evening trading Tuesday after the wireless phone maker reported a surge in earnings that nevertheless missed analyst expectations, while video games maker Electronics Arts dropped after its results disappointed investors. Read more...

Testosterone Patch Hailed As Female Viagra Today, 06:48 PM
Testosterone Patch Revs Up Sex Life for Women After Menopause, Study Shows Read more...

StorageTek sees stronger demand as profit tops target Today, 06:48 PM
SAN FRANCISCO (CBS.MW) — Storage Technology reported a 38 percent increase in its third-quarter earnings Tuesday, citing stronger demand for its data management technologies. Read more...

Sidebar:

Search Articles: [ 405 ]

Article Length: ⊟━━○━━⊞

Sort By:
Date
Title
Source
New

Recent Articles:
All
Today
Yesterday
Last Seven Days
This Month
Last Month

RSS Feeds:
All
Film Unlimited
MacCentral News
Business
Health
Technology
Travel

FIG. 4B

RSS Feeds

1041 New, 1041 Total

- Microsoft to Debut 'Istanbul' Application  Today, 06:25 PM
  Microsoft Introduces Desktop Computer Application That Aims to Seamlessly Integrate E-Mail Read more...
- Seagate's Net Income Drops 73 Percent  Today, 06:25 PM
  Seagate's Net Income Drops 73 Percent, but Still Beats Wall Street Forecasts  Read more...
- AK Steel, Overstock.com, Reuters, Sprint, more  Today, 06:25 PM
  The latest on stocks that made major moves in U.S. equity markets.  Read more...
- Dollar Falls Against Most Rivals  Today, 06:23 PM
  Dollar Declines Against Rivals As Falling Oil Prices Help the Yen Reach Three-Month Highs  Read more...
- Electronic Arts net rises 27% as sales jump 35%  Today, 06:22 PM
  LOS ANGELES (CBS.MW) – Electronic Arts said Tuesday its fiscal second-quarter earnings rose 27 percent, yet the video game maker's shares fell 5 percent after it cut its profit forecast for the December quarter because several games will ship later than expected. Read more...
- Electronic Arts net rises 27% as sales jump 35%  Today, 06:22 PM
  LOS ANGELES (CBS.MW) – Electronic Arts said Tuesday its fiscal second-quarter earnings rose 27 percent, yet the video game maker's shares fell 5 percent after it cut its profit forecast for the December quarter because several games will ship later than expected. Read more...

Sources:
- Gizmodo
- Guardian Unlimited
- Inside Mac Games
- CBS MarketWatch...
- CBS MarketWatch...
- CBS MarketWatch...
- CBS MarketWatch...
- MedicineNet Daily...
- The New York Times...
- The New York Times...
- The New York Times...
- The New York Times...
- The New York Times...
- The New York Times...
- The New York Times...
- The New York Times...
- The New York Times...
- O'Reilly Network D...
- RollingStone.com
- RollingStone.com
- SPACE.com
- washingtonpost.co...
- washingtonpost.co...
- washingtonpost.co...
- washingtonpost.co...
- washingtonpost.co...

RSS Feeds

1041 New, 1041 Total

RSS Feeds

Seagate's Net Income Drops 73 Percent Today, 06:25 PM
Seagate's Net Income Drops 73 Percent, but Still Beats Wall Street Forecasts Read more...
CBS MarketWatch....
CBS MarketWatch....
CBS MarketWatch....

AK Steel, Overstock.com, Reuters, Sprint, more Today, 06:25 PM
The latest on stocks that made major moves in U.S. equity markets. Read more...
MedicineNet Daily...
The New York Times...
The New York Times...

Dollar Falls Against Most Rivals Today, 06:23 PM
Dollar Declines Against Rivals As Falling Oil Prices Help the Yen Reach Three-Month Highs Read more...
The New York Times...
The New York Times...
The New York Times...

Electronic Arts net rises 27% as sales jump 35% Today, 06:22 PM
LOS ANGELES (CBS,MW) - Electronic Arts said Tuesday its fiscal second-quarter earnings rose 27 percent, yet the video game maker's shares fell 5 percent after it cut its profit forecast for the December quarter because several games will ship later than expected. Read more...
The New York Times...
The New York Times...
O'Reilly Network D...
RollingStone.com
RollingStone.com
SPACE.com Electronic Arts net rises 27% as sales jump 35% Today, 06:22 PM
LOS ANGELES (CBS,MW) - Electronic Arts said Tuesday its fiscal second-quarter earnings rose 27 percent, yet the video game maker's shares fell 5 percent after it cut its profit forecast for the December quarter because several games will ship later than expected. Read more...
washingtonpost.co...
washingtonpost.co...
washingtonpost.co...
washingtonpost.co...
washingtonpost.co...
washingtonpost.co...

FDA Searches Worldwide for More Flu Shots Today, 06:20 PM
FDA Searches Worldwide for More Flu Vaccine, Says 2.6M More Doses Will Be Available in January Read more...

Actions:
Mail Link to This Page

FIG. 4C

RSS Feeds feeds:RSS%20Feeds&film.guardian.co.uk/rss/1,,00.xml&maccentral.macw

Apple  Mac  Amazon  eBay  Yahoo!  News ▼  RSS Feeds (135) ▼

RSS Feeds

1041 New, 1041 Total

401A

AK Steel, Overstock.com, Reuters, Sprint, more  Today, 06:25 PM
The latest on stocks that made major moves in U.S. equity markets. Read more...

Dollar Falls Against Most Rivals  Today, 06:23 PM
Dollar Declines Against Rivals As Falling Oil Prices Help the Yen Reach Three-Month Highs  Read more...

Electronic Arts net rises 27% as sales jump 35%  Today, 06:22 PM
LOS ANGELES (CBS.MW) – Electronic Arts said Tuesday its fiscal second-quarter earnings rose 27 percent, yet the video game maker's shares fell 5 percent after it cut its profit forecast for the December quarter because several games will ship later than expected. Read more...

Electronic Arts net rises 27% as sales jump 35%  Today, 06:22 PM
LOS ANGELES (CBS.MW) – Electronic Arts said Tuesday its fiscal second-quarter earnings rose 27 percent, yet the video game maker's shares fell 5 percent after it cut its profit forecast for the December quarter because several games will ship later than expected. Read more...

FDA Searches Worldwide for More Flu Shots  Today, 06:20 PM
FDA Searches Worldwide for More Flu Vaccine, Says 2.6M More Doses Will Be Available in January  Read more...

Millipore Q3 Income rises 2%  Today, 06:19 PM
WASHINGTON (CBS.MW) – Biotechnology firm Millipore Corp.'s third-quarter profits inched up 2 percent though CBS MarketWatch...
MedicineNet Daily ...
The New York Times...
The New York Times...
The New York Times...
The New York Times...
The New York Times...
The New York Times...
The New York Times...
The New York Times...
O'Reilly Network D...
RollingStone.com ...
RollingStone.com ...
SPACE.com
washingtonpost.co...
washingtonpost.co...
washingtonpost.co...
washingtonpost.co...
washingtonpost.co...
washingtonpost.co...
washingtonpost.co...

Actions:  401B
Mail Link to This Page
Add Bookmark...

FIG. 4D

FIG. 4F